(12) United States Patent
Watters et al.

(10) Patent No.: US 7,896,080 B1
(45) Date of Patent: Mar. 1, 2011

(54) METHOD OF IMPROVING HYDROCARBON PRODUCTION FROM A GRAVEL PACKED OIL AND GAS WELL

(76) Inventors: Larry Watters, Spring, TX (US); Jeff Watters, Cypress, TX (US); Mahadev Ammachathram, Spring, TX (US)

( * ) Notice: Subject to any disclaimer, the term of this patent is extended or adjusted under 35 U.S.C. 154(b) by 563 days.

(21) Appl. No.: 11/530,256

(22) Filed: Sep. 8, 2006

(51) Int. Cl.
*E21B 21/00* (2006.01)
*E21B 37/08* (2006.01)
(52) U.S. Cl. ............... 166/312; 166/305.1; 166/307
(58) Field of Classification Search ............... None
See application file for complete search history.

(56) References Cited

U.S. PATENT DOCUMENTS

| 6,832,655 | B2* | 12/2004 | Ravensbergen et al. ...... 166/311 |
| 7,028,775 | B2* | 4/2006 | Fu et al. ...................... 166/308.2 |
| 7,192,908 | B2* | 3/2007 | Frenier et al. ................. 507/241 |
| 2007/0187090 | A1* | 8/2007 | Nguyen et al. ............... 166/249 |

* cited by examiner

*Primary Examiner* — Zakiya W Bates
*Assistant Examiner* — Angela M Ditrani
(74) *Attorney, Agent, or Firm* — Garvey, Smith, Nehrbass & North, L.L.C.; Gregory C. Smith

(57) ABSTRACT

This invention relates to enhancing hydrocarbon production from a subterranean formation via a well completed with a gravel pack. Gravel packs suffer plugging and damage over time from produced particles and other plugging materials brought into the pack as production continues. This invention relates to a chemical treatment for the gravel pack designed to remove damaging particulate matter from the pack via dissolution or displacement. Damaging material is forced sufficiently far into the producing reservoir to prevent its remigration back into the pack.

64 Claims, 21 Drawing Sheets

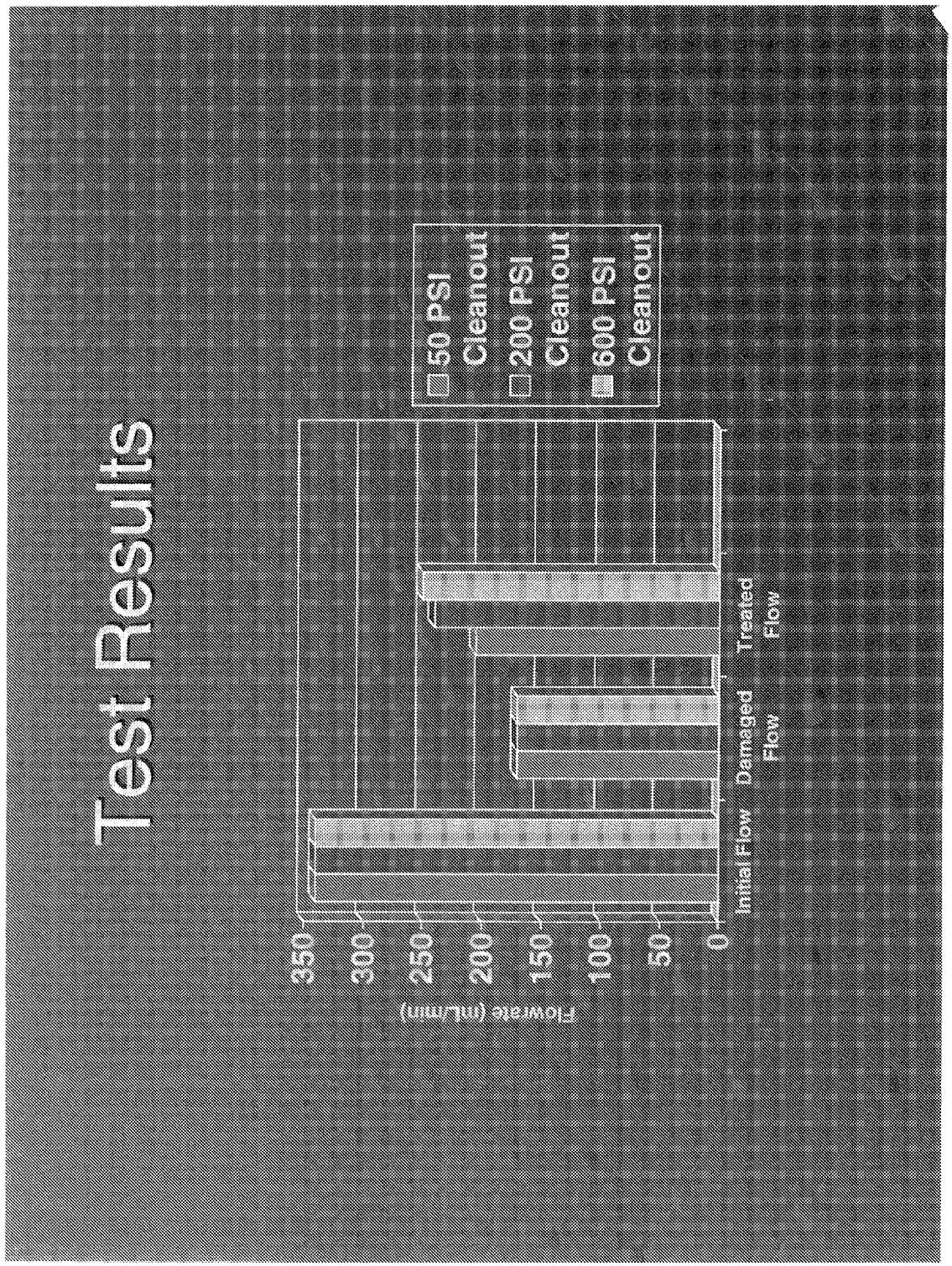

METHOD OF IMPROVING HYDROCARBON PRODUCTION FROM A GRAVEL PACKED OIL AND GAS WELL

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a method of improving hydrocarbon production from a reservoir that was completed with a gravel pack, wherein fine particles that clog the gravel pack are removed from the gravel pack so that hydrocarbon production is increased.

2. General Background of the Invention

Formations that exhibit a tendency to release formation particles during hydrocarbon production (commonly called "sanding" or "fines migration") create problems as these particles are released into the hydrocarbon stream. Particles can bridge in formation flow channels and impede production rate. Particles carried into a well bore with produced hydrocarbon can also erode well structure such as tubulars and well heads. Such particles can settle into the bottom of a well bore and impede production.

Common practice for completing wells drilled into high-permeability formations with sanding tendency through the early 1990's was to install a tubular wire screen into the well bore and gravel pack the space between the screen and casing or bore hole wall. Gravel packing is still a preferred completion method for many low budget wells drilled into high-permeability formations with sanding tendencies.

The gravel packing operation includes a transport of sand into the space between the screen and the casing, and into the perforation tunnels. The sand is sized to prevent fine particles or fines from the specific formation from passing through the pack (usually 20-40 mesh or 30-50 mesh or 40-60 mesh). The sand is deposited into the annulus behind the screen and then packed to create a filter to stop the fine particulate matter or fines from migrating into the well bore. The screen openings are further sized to act as a final filter for any fines migrating through the sand bed. Thus, the problems of producing from sanding formations are mitigated.

This gravel pack type of completion method always damages the permeability of the formation compared to native permeability of the reservoir rock. Additionally, as fines migrate into the well and are trapped by the gravel pack, permeability is further reduced resulting in reduced production rates.

BRIEF SUMMARY OF THE INVENTION

The present invention provides a method of removing fine particulate matter (fines) deposited into a gravel pack. Application of the invention results in removal of fines from the pack thereby increasing the conductivity of the gravel pack and the resulting productivity of the oil reservoir.

The method of the present invention employs both chemical and mechanical means to remove the fine particulate matter or fines.

A chemical wash (solvents and acids) is first injected down tubing (e.g. coiled or jointed) into the gravel pack at low matrix injection rates (e.g. ½ to 1 barrel per minute or bpm). Solvents remove hydrocarbons, and acids remove silts and clays.

A water-based flush follows the chemical flush. The function of the water based flush is to displace any fine particulate matter or fines not dissolved by the chemical wash and to displace reaction products from the chemical stage sufficiently far into the well bore so that any resulting precipitation will not damage the near well bore area. Injection of aqueous flush is initially at same rate as chemical flush. After half the volume of flush is placed, injection rate is increased to increase mechanical energy applied to the remaining fines.

One placement option is to continue increasing injection rate until a narrow hydraulic fracture is initiated. Fines swept into the fracture will be trapped when the crack closes. Care must be taken in this scenario to avoid creating a fracture with sufficient width to accept pack sand.

The present invention provides a fluid train pumped into the well and through the gravel pack. The fluid train consists of a chemical portion followed by an aqueous-based flush to impart further mechanical energy into the cleaning process.

The chemical portion employs an organic solvent, an HCL or organic acid preflush, and an HF or combination of HCL:HF acid flush to dissolve any organics, silt and clays deposited in the pack. This chemical portion of the fluid train is then pushed far back into the formation by an overflush. The overflush can be acid, treated water, or a combination of the two and is designed to fulfill two purposes. First, the overflush sweeps the chemical flush laden with reaction products far out into the surrounding formation. Volumetric design includes sufficient overflush to sweep the chemical flush a distance away from the well bore. This physical removal of reactive fluids prevents any secondary precipitation of products from the fluids to leave damaging solids in the gravel pack or near well bore. The volume of overflush is designed to sweep the chemical flush preferably about three feet (3') or more from the well bore. Thus, if any precipitation would occur with time, the damage to permeability so far away from the well bore would be minimal. A second purpose of the overflush is to sweep from the gravel pack any fines not dissolved or removed from the pack by the chemical flush. The method of the present invention can thus include the step of increasing displacement rate of the overflush several times throughout the injection to take advantage of penetration of fluids into less permeable formation driven by increased injection pressure derived from increased overflush flow rate.

A methanol-water mixture is injected into the pack and left until the well is returned to production. This mixture is left in the pack to eliminate potential for any adverse reaction with the overflush and to improve wettability of sand to hydrocarbon, to reduce surface tension and to further dissolve any blocking material.

General fluid types and volumes (exemplary) are listed in the table below, however volumes may change depending on formation characteristics.

| | |
|---|---|
| Tubing Pickle | 2000 gal |
| Injection rate fluid | 5 gal/ft |
| Solvent preflush | 10 gal/ft |
| Preflush | 20 gal/ft |
| Acid preflush | 15 gal/ft |
| HF acid | 10 gal/ft |
| Overflush | 40 gal/ft |
| Methanol-water | 2 gal/ft |
| Displacement | tubing volume |

The treatment of the present invention alleviates any need for extensive design. Any gravel pack with production decline over time is a candidate. Users should be aware of decline rates versus predicted production decline resulting from reservoir depletion. Any decreased production in excess of that predicted by reservoir depletion curves is assumed to be a result of increased damage to the gravel pack. Treatment design is based on height of gravel pack screen in place. The height of screen is multiplied by the specified volume per foot of each fluid to establish injection volumes.

The tubing pickle must be circulated down via coiled tubing and up the coiled tubing-production tubing annulus. The pickle treatment may also be performed before coiled tubing is in the well bore and can be flushed with a gas such as nitrogen. All other fluids can be injected either through the coil tubing or down the production tubing with the coil tubing removed. All aqueous fluids are freshwater based with the exception of displacement which can be a sea water or brine. The treatment procedure is outlined in the following steps:

1) Circulate tubing pickle;
2) Establish injection rate of ½ to 1 bpm;
3) Pump first 4 stages at established rate;
4) Pump first 20 gal/ft overflush at established rate;
5) Increase pump rate by ½ bpm and pump 2 minutes;
6) Continue pumping overflush increasing rate ½ bpm at 2 minute intervals until max pressure is reached or frac is initiated;
7) Pump remainder of overflush at max rate achieved.

Pumping the treatment into the well can employ a coiled tubing unit, pressure pumping unit, and fluid tanks. Treatment rates are dictated by the pressure limitations of the pump and the diameter of the coiled tubing and infectivity into pack and formation. Estimates of formation fracture gradient must be obtained and injection rates kept at or below the rate necessary to impart fracturing pressure at the formation.

One potential application difficulty might arise if one portion of the perforated interval takes injected fluid much more easily than the rest of the perforations. If that is the case, the gravel pack may not be completely contacted and treated by the injected fluid train. Moving the coiled tubing end up and down the length of the screen interval during the injection procedure alleviates the possibility of injecting through the pack at only one point. This practice would maximize the probability of complete pack treatment.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 20-21 are graphical illustrations of test results that demonstrate increased hydrocarbon production for a test well after using the method of the present invention.

DETAILED DESCRIPTION OF THE INVENTION

Figure 1:
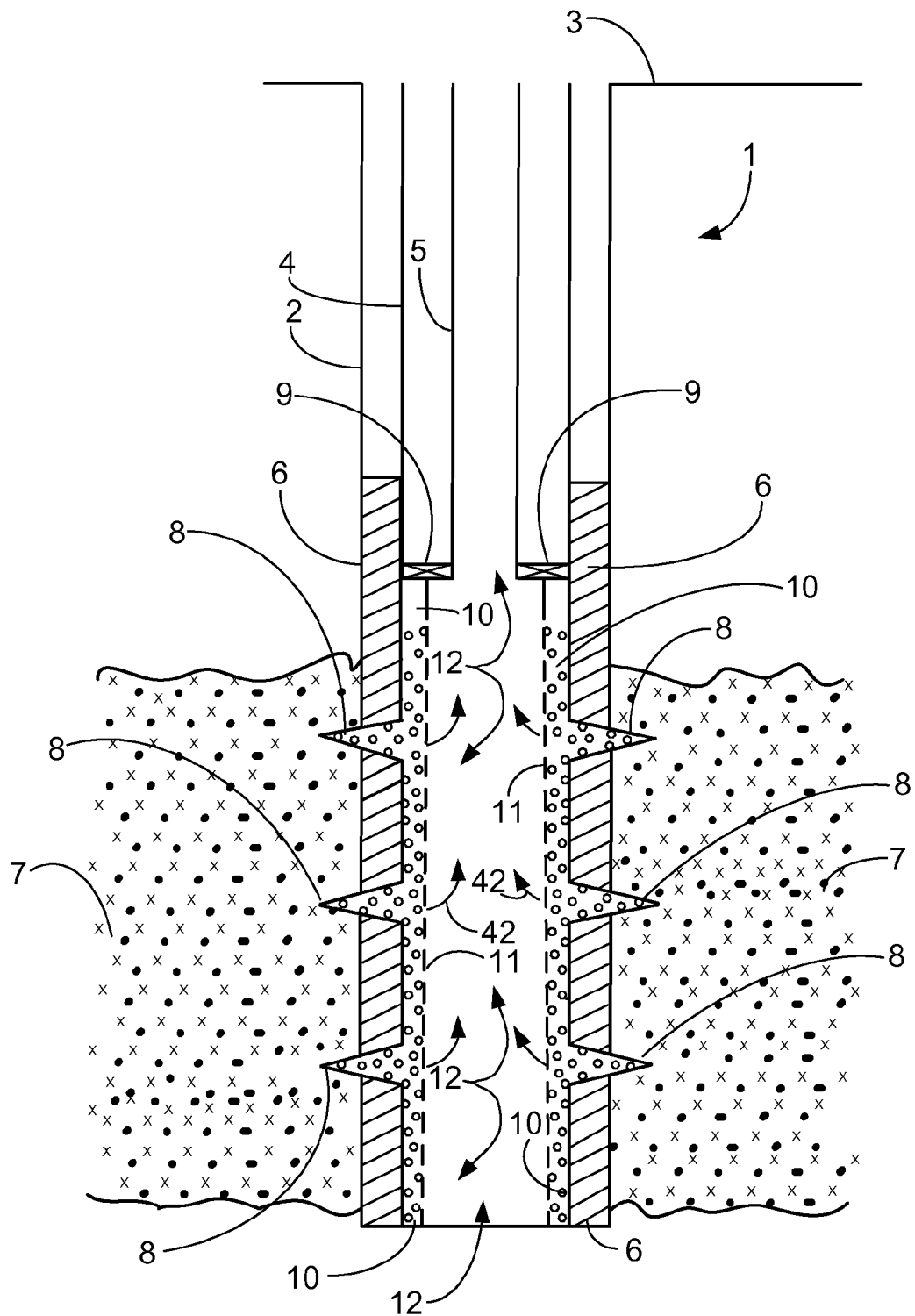
FIG. 1 is a schematic, sectional elevation view of a well that has been completed using a gravel pack.

FIG. 1 shows a typical well that has been completed using a gravel pack. In FIG. 1, the oil and gas well 1 provides a borehole 2 that extends downwardly from the earth's surface 3. Casing 4 can be used to line the well borehole 2 as shown in FIG. 1. A production tubing 5 extends internally of the casing 4 in a manner that is known in the art. The production tubing 5 extends downwardly to a position next to a producing formation 7. A cemented annulus 6 can be formed in between producing formation 7 and casing 4. Production packer 9 is placed in between production tubing 5 and casing 4 above the producing formation 7.

A plurality of perforations 8 extend through cemented annulus 6 and communicate with the producing formation 7. Gravel pack 10 is placed in between screen 11 and cemented annulus 6. Oil and gas that is produced from well 1 flows from producing formation 7 through perforations 8, then through gravel pack 10 and screen 11 to well bore 12. Arrows 42 in FIG. 1 schematically illustrate the flow of oil and gas from producing formation 7 to well bore 12.

Figure 2:
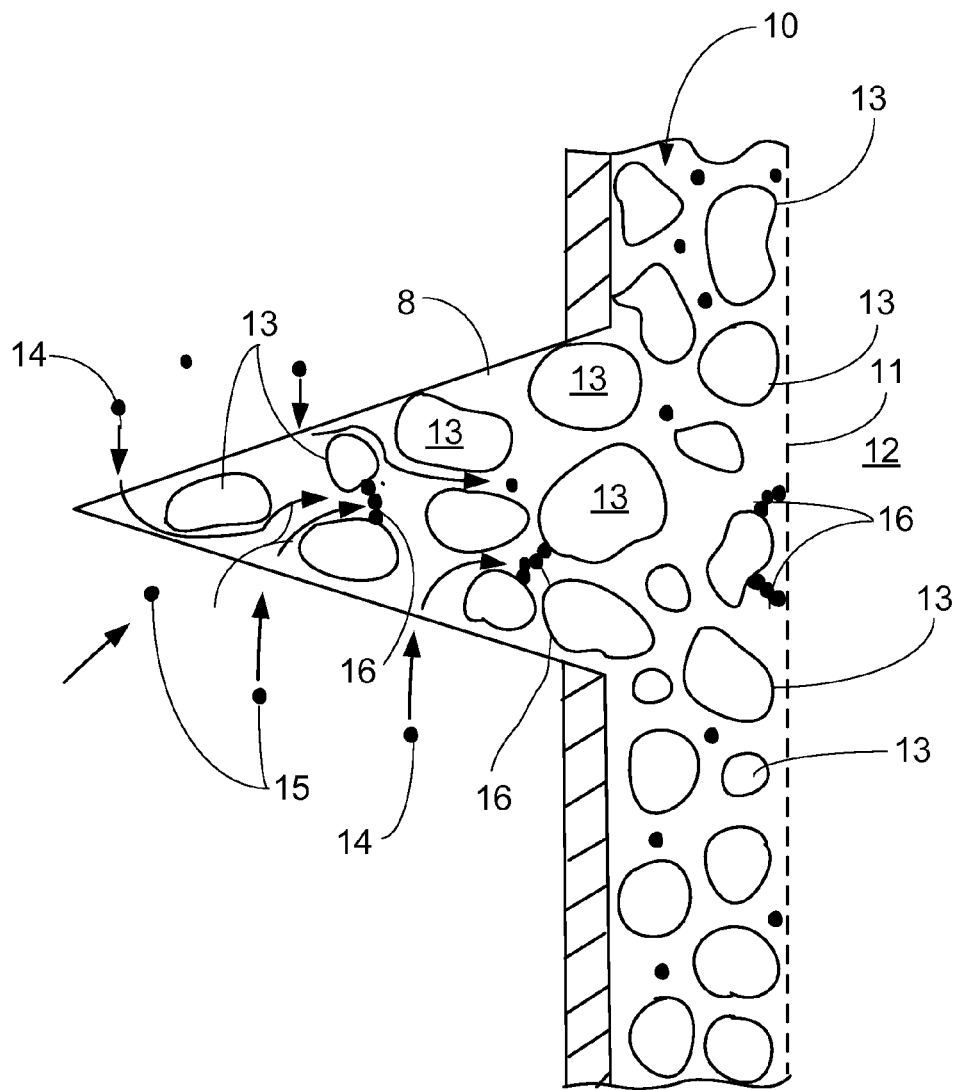
FIG. 2 is a fragmentary elevation view illustrating fines migration plugging a gravel pack.

In FIG. 2, the gravel pack 10 is shown in more detail, including a number of different pieces of gravel 13 that can become clogged with fine particulate matter or fines 14. These fines 14 flow into the perforations 8 and can clog the spaces between individual pieces of gravel 13 as indicated schematically by the arrow 15 in FIG. 2. The numeral 16 which indicates areas that have an accumulation of fines 14 and thus provide a flow impediment to hydrocarbon that is to be produced from formation 7 to well bore 12.

Figure 3:
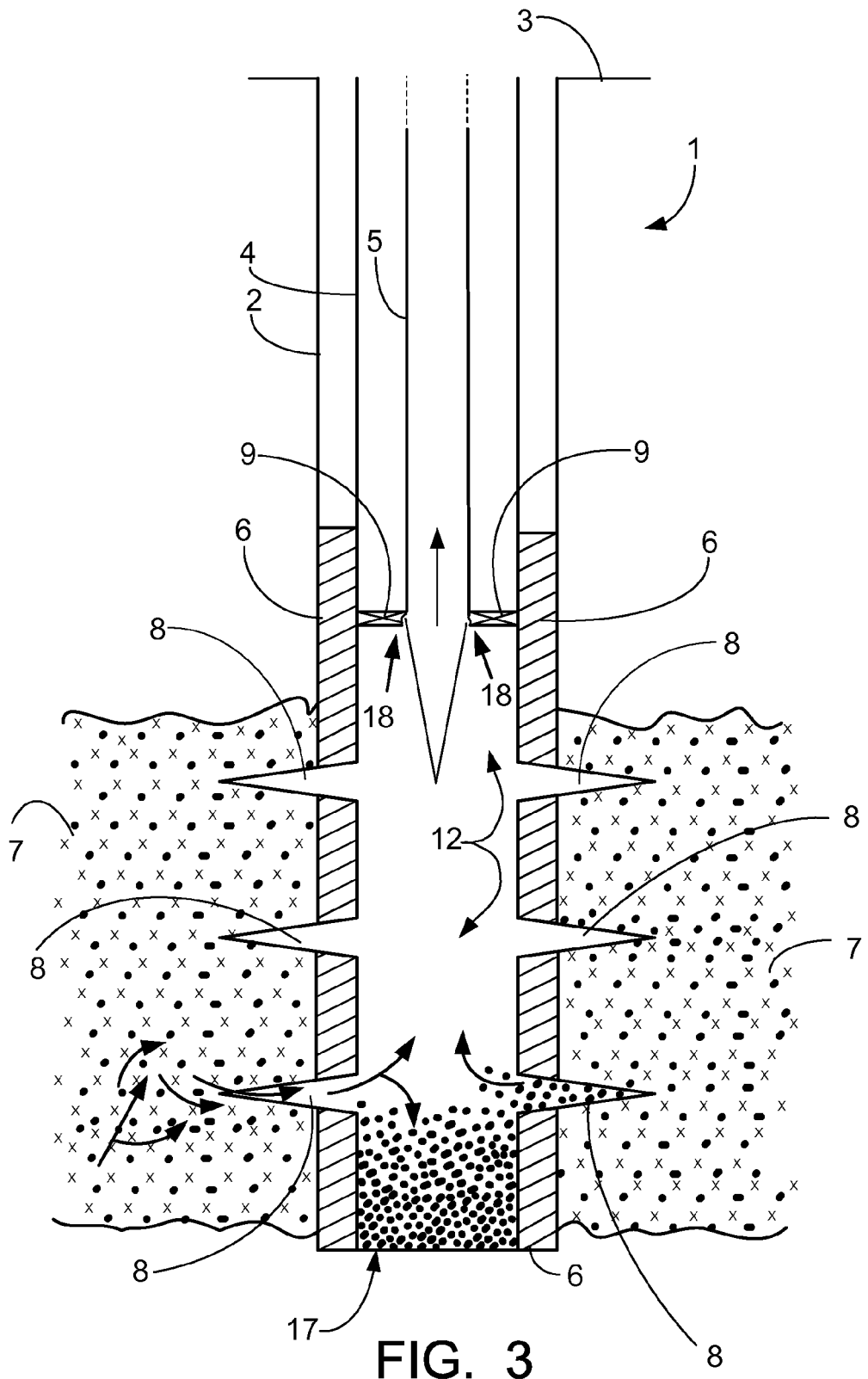
FIG. 3 is a fragmentary elevation view of fines migration plugging a gravel pack and flowing into the open well bore.

In FIG. 3, another problem that is experienced by oil and gas wells 1 is illustrated. In FIG. 3, heavy particulate matter that has settled is indicated by the numeral 17. Additionally, FIG. 3 shows generally examples of erosion sites 18 that can be eroded by the flow of particulate matter that escapes the producing formation 7 and enters the well bore 12.

Figure 4:
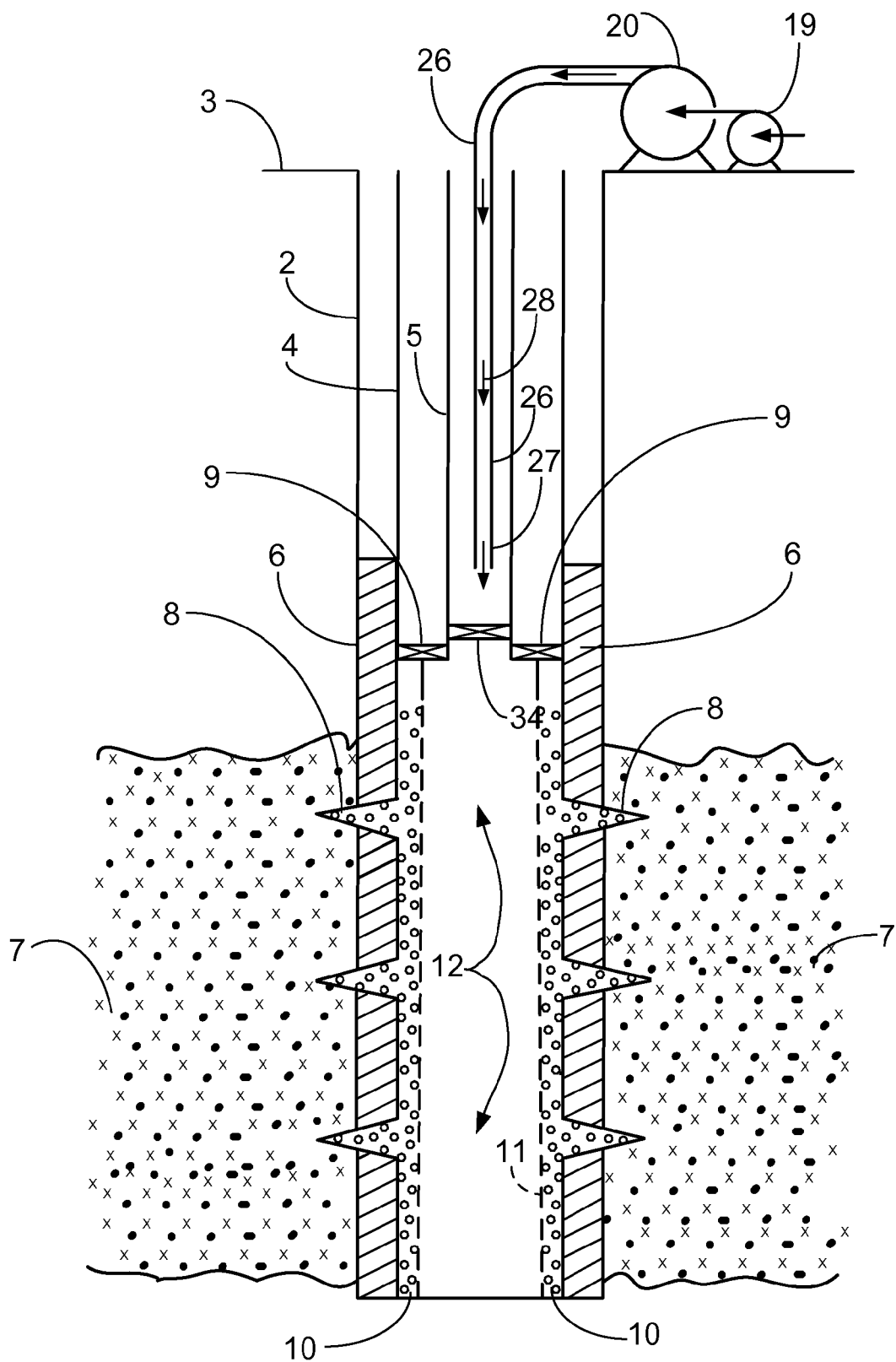
FIG. 4 is a schematic, sectional elevation view of a step of the method of the present invention using tubing such as coil tubing to place a plug in the production tubing and circulating pickling fluid above the plug.
Figure 5:
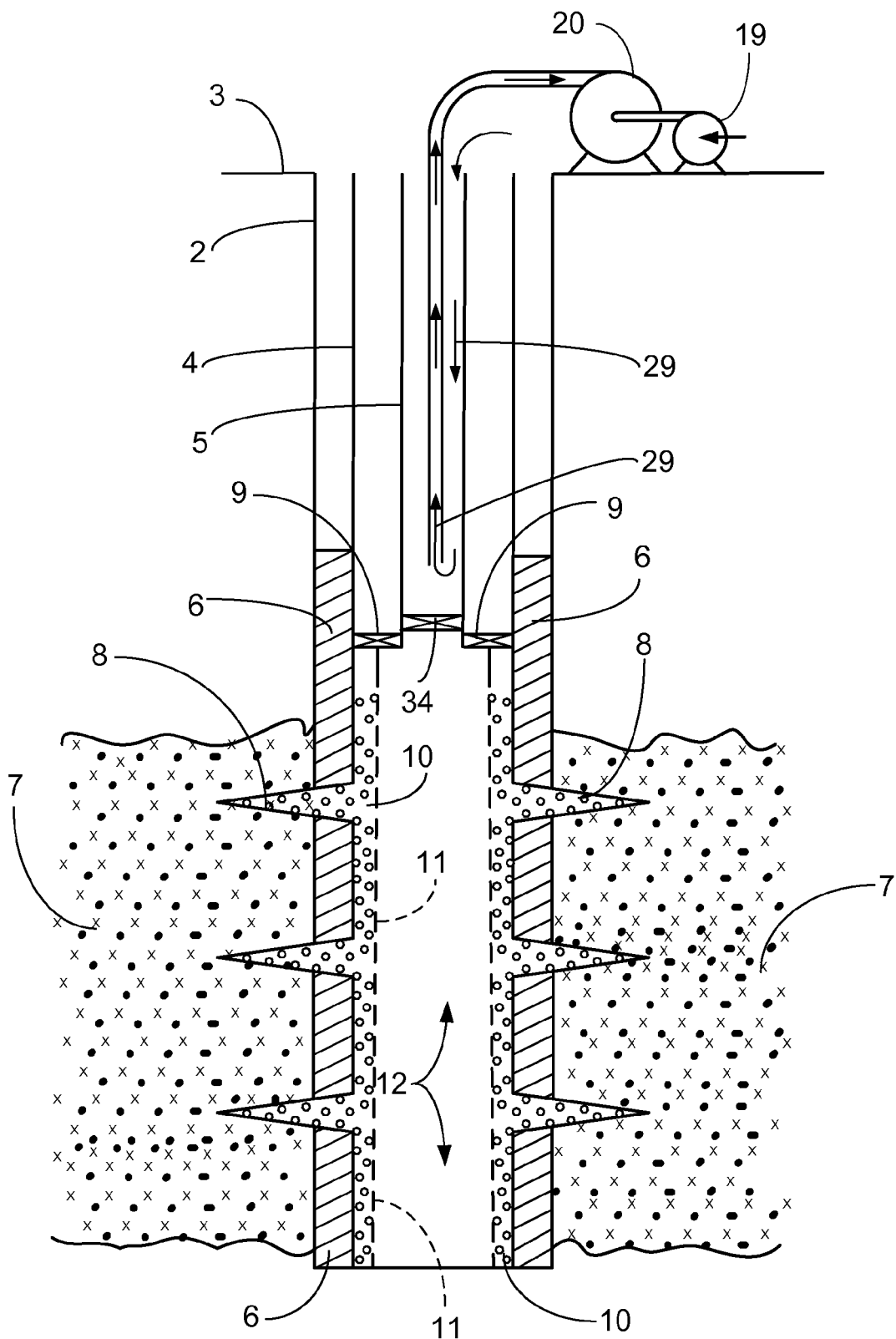
FIG. 5 is a schematic, sectional elevation view of a step of the method of the present invention illustrating circulating of pickling fluid.

In FIGS. 4 and 5, there is schematically illustrated the placement of pickling fluid or a "pickle". A pickle is simply a fluid that is used to remove scale, rust, deposits or any other undesirable material or hydrocarbon (e.g. crude oil, paraffin, pipe dope, etc.) from the surface of the production tubing string 5 to expose metal surface to acid. Use of the pickle or the "pickling process" removes materials that may react undesirably with the treatment fluids that are to be used with the method in the present invention. The pickling process eliminates the possibility of creating undesirable secondary reactions or precipitates that might damage the producing formation 7.

In FIG. 4, a pressure pump 19 can be used in combination with a coil tubing unit 20 to place the fluid that comprises the "pickle". Such a coil tubing unit 20 is known in the art and utilizes an elongated coil tubing 26 having a lower end portion 27 that is lowered into the well 1. Flow of the pickle is illustrated schematically by the arrows 28 for injecting the selected fluid and by the numeral 29 for removing it from the well. The pickle or pickling fluid is a combination of an acid, usually HCL and an organic solvent, usually Xylene. During this process of FIGS. 4 and 5, a plug 34 can be placed in the production tubing 5 at an elevation that is near the bottom of the production tubing 5 as shown in FIGS. 4 and 5. After the tubing is pickled, the remainder of the treatment can be placed into the gravel pack via the coiled tubing after removing the bridge plug and lowering the coil into position with the tubing end adjacent to the gravel pack screen. Alternatively, the remainder of the treatment fluids may be injected down the production tubing after retrieving the coiled tubing. The remainder of the illustrations show treatment through coiled tubing.

Figure 6:
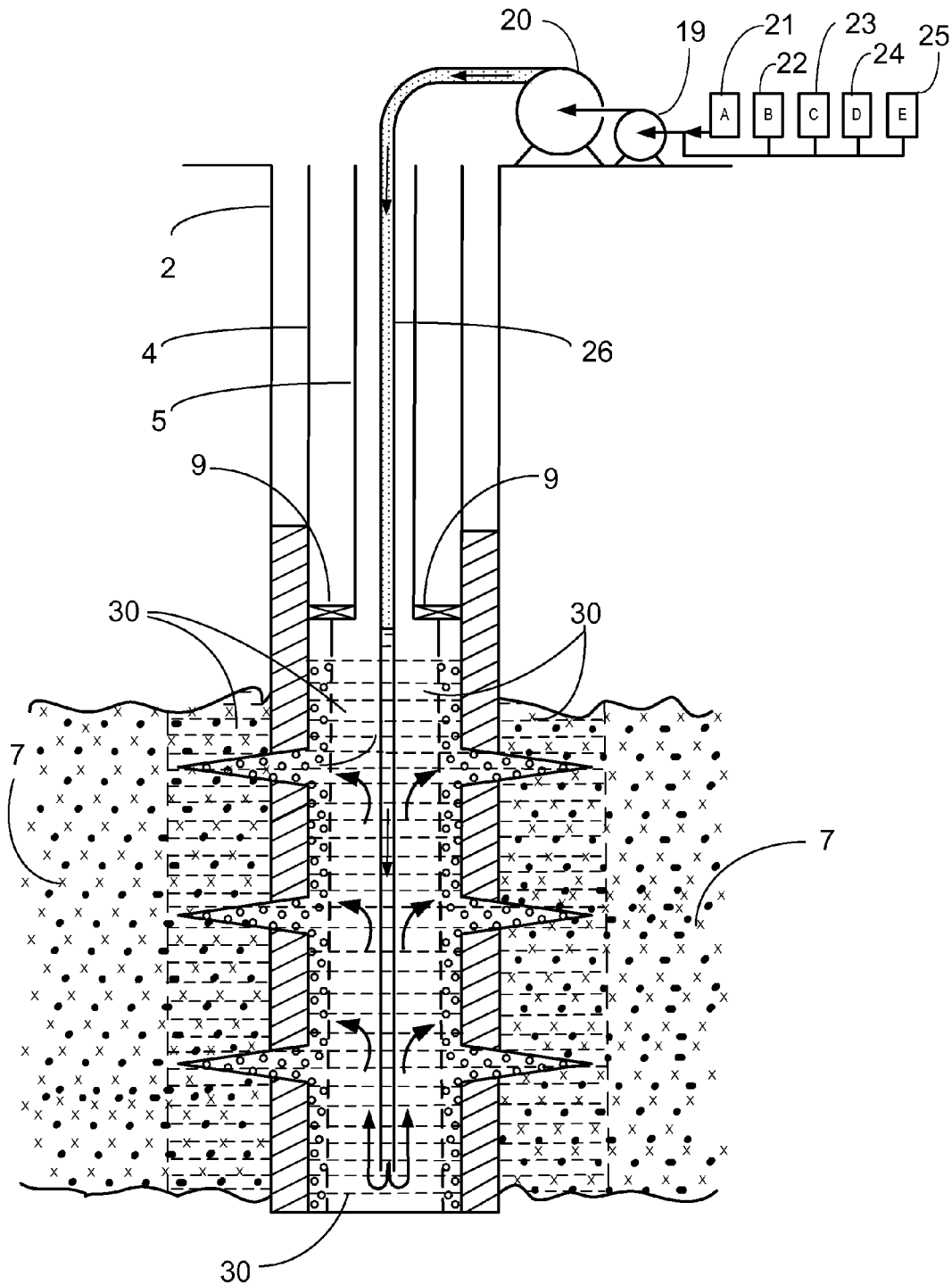
FIG. 6 is a schematic, sectional elevation view of the method of the present invention showing solvent preflush with coil tubing fully extended through production packer and to bottom of gravel screen.
Figure 7:
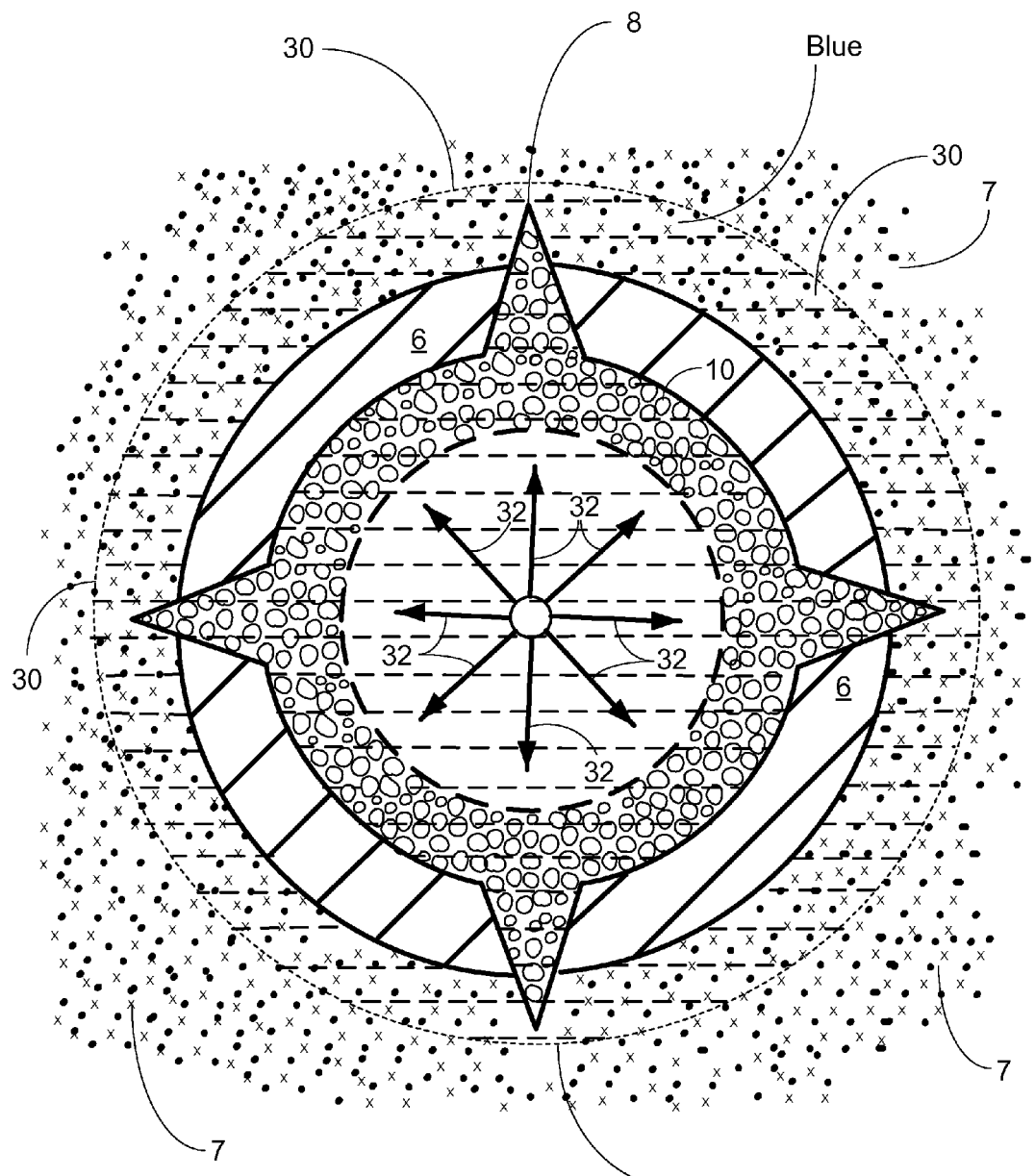
FIG. 7 is a transverse, sectional view showing solvent preflush flow into the producing formation.

FIGS. 6 and 7 illustrate a solvent preflush. In FIGS. 6 and 7, a number of tanks 21, 22, 23, 24, 25 can be provided, each tank supplying a different fluid that can be used as part of a fluid train employed with the method of the present invention. The first tank 21 can contain the solvent preflush 30. The solvent preflush 30 of tank 21 can be Xylene or methanol or other organic liquid capable of dissolving paraffin. This organic preflush is treated with a non-emulsifying surfactant to prevent emulsion blocks. The solvent preflush 30 is used to remove hydrocarbons (e.g. crude oil, paraffin, etc.). Solvent preflush also acts as a barrier between formation fluids. The solvent preflush 30 is injected into the well bore below production packer 9. A sufficient volume of the solvent preflush 30 is injected into the well (using pump 19, coil tubing unit 20 and its coil tubing 26) so that the solvent preflush 30 extends into the gravel pack 10, perforations 8, and a part of the producing formation 7. Arrows 32 in FIG. 7 illustrate schematically the flow of solvent preflush 30 into the surrounding formation 7.

Figure 8:
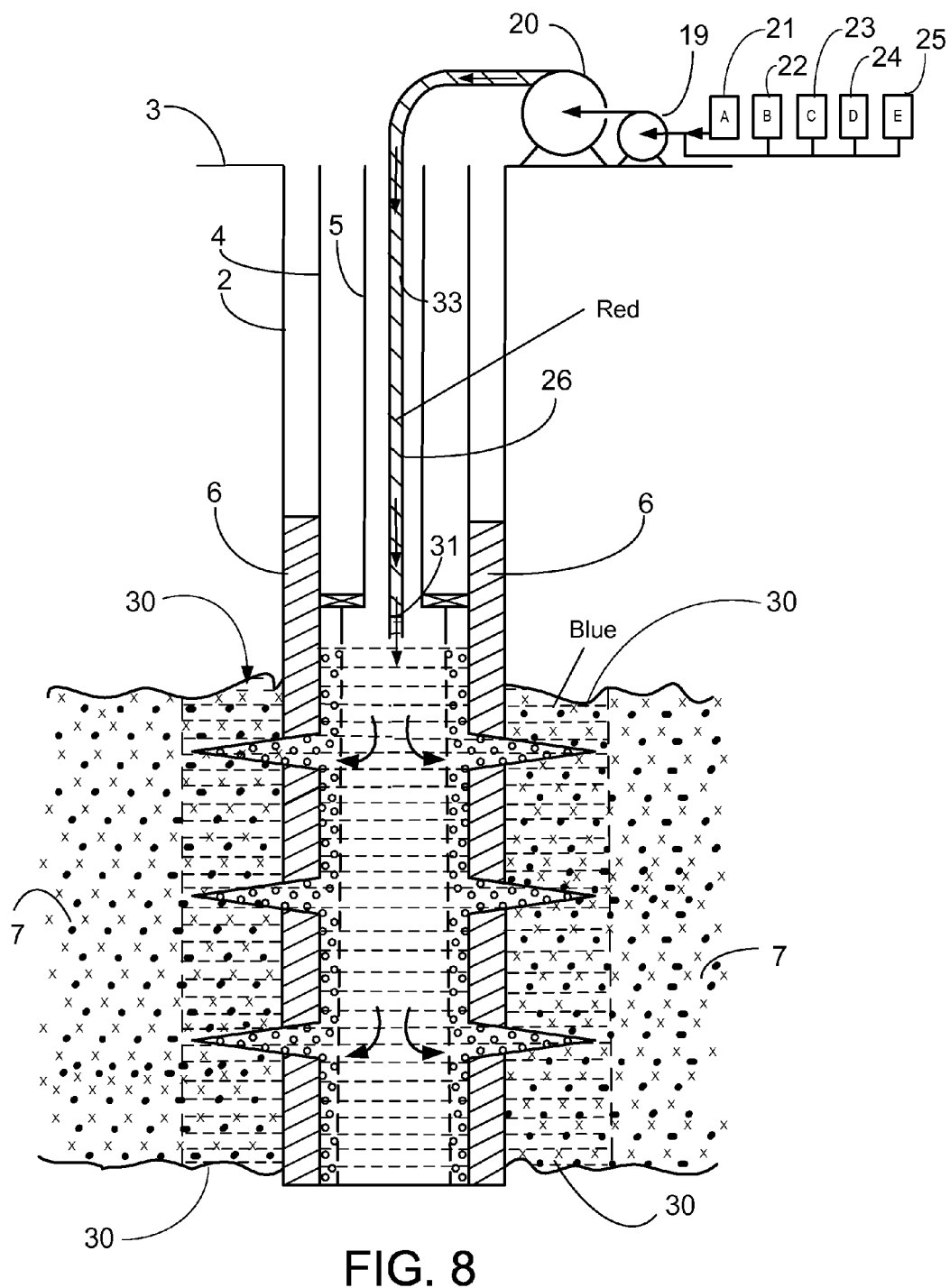
FIG. 8 is a sectional elevation view of a method step of the present invention, showing solvent preflush with coil tubing extending through the production packer partially to a position next to the top of the gravel pack.
Figure 9:
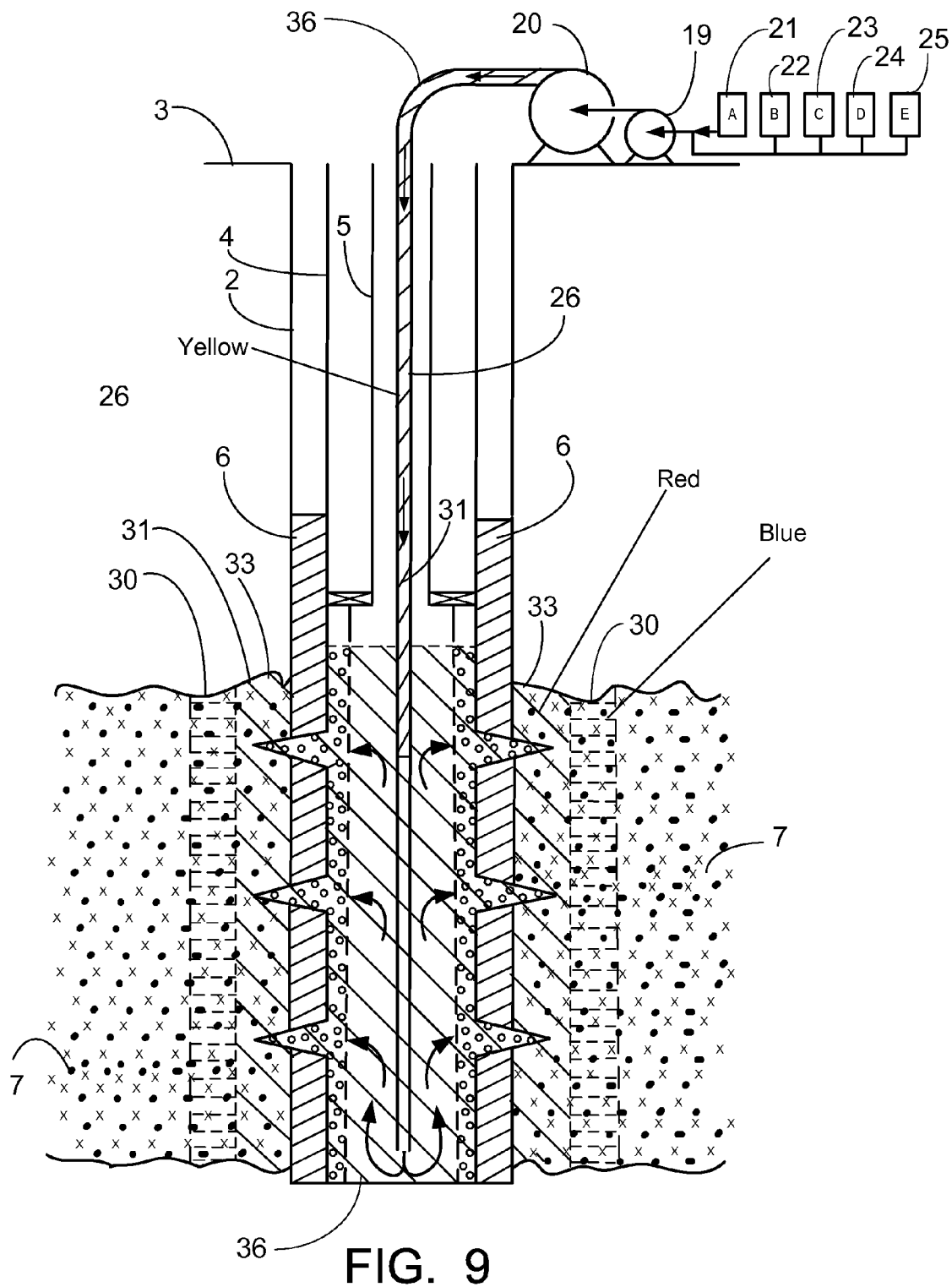
FIG. 9 is a sectional elevation view of the method of the present invention showing placement of a water preflush into the producing formation.

Tank 22 can contain a water based preflush 33 which is injected using coil tubing unit 20 and its coil tubing 26. This fluid consists of water, $NH_4Cl$ for clay stabilization, a water-wetting surfactant, and a non-emulsifying surfactant. As shown in FIG. 8, the water based preflush 33 is transmitted via the coil tubing 26 immediately behind the solvent preflush 30. In FIGS. 8 and 9, the water based preflush 33 pushes the solvent preflush 30 further into the surrounding producing formation 7. The water based preflush 33 maintains compatibility with clays before and after ion exchange occurs. The water based preflush also acts as barrier between formation fluids and treating fluids. FIG. 9 shows the relative positions of the solvent preflush 30 and the water based preflush 33, the interface being indicated as solvent/preflush interface 31.

Figure 10:
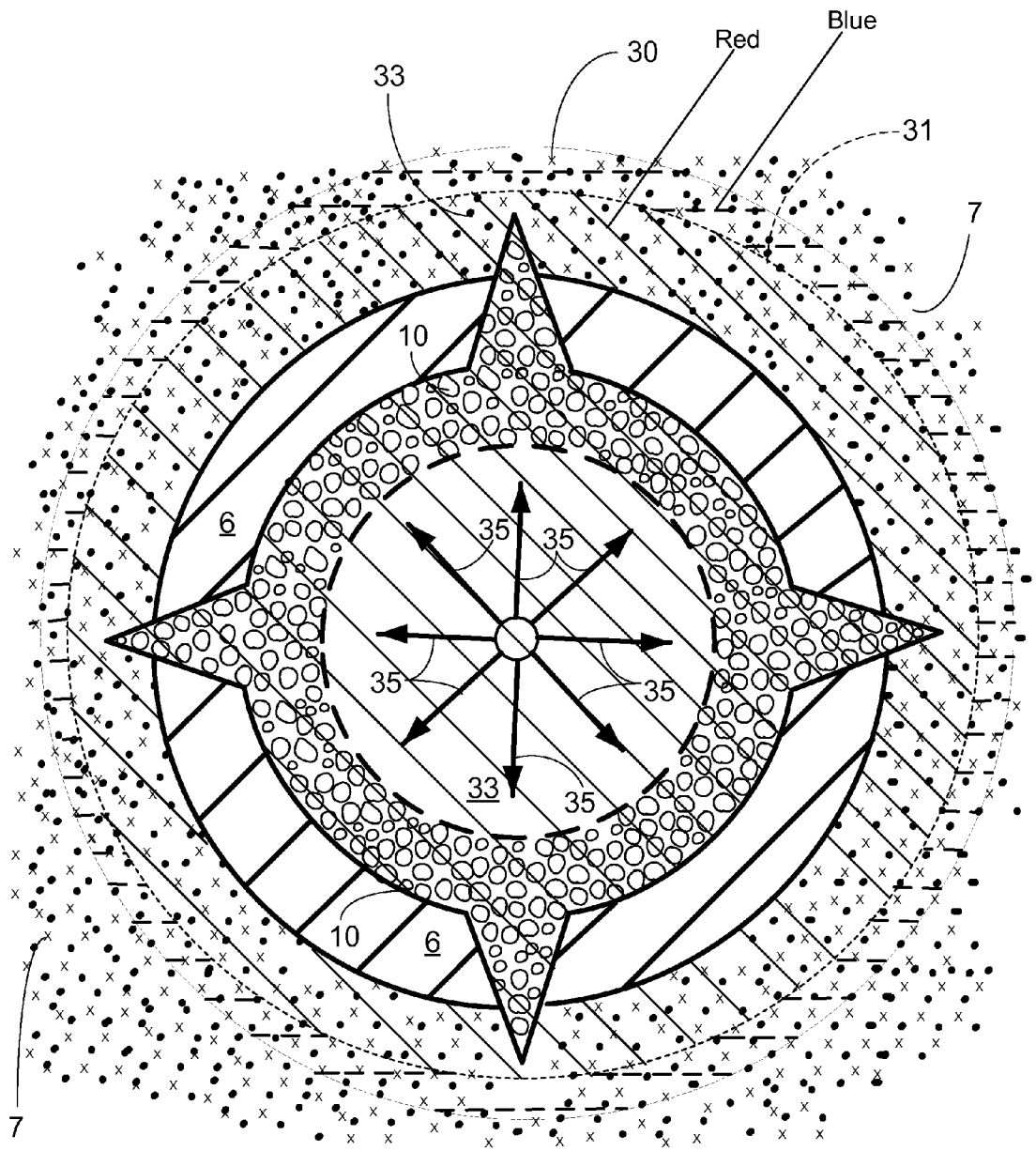
FIG. 10 is a transverse sectional view showing water preflush flow into the producing formation.

In FIGS. 9-10, an acid preflush 36 of tank 23 is pumped into the well bore using coil tubing unit 20 and its coil tubing 26. FIG. 10 shows a sectional view with arrows 35 illustrating the radial flow of acid preflush through the gravel pack 10 and into the surrounding formation 7. The acid preflush 36 removes any carbonates present. This fluid consists of HCL, a combination of HCL and an organic acid such as acetic or formic for clay protection, or just the organic acid combined with wetting agents, non-emulsifying surfactant, and corrosion inhibitors.

Figure 11:
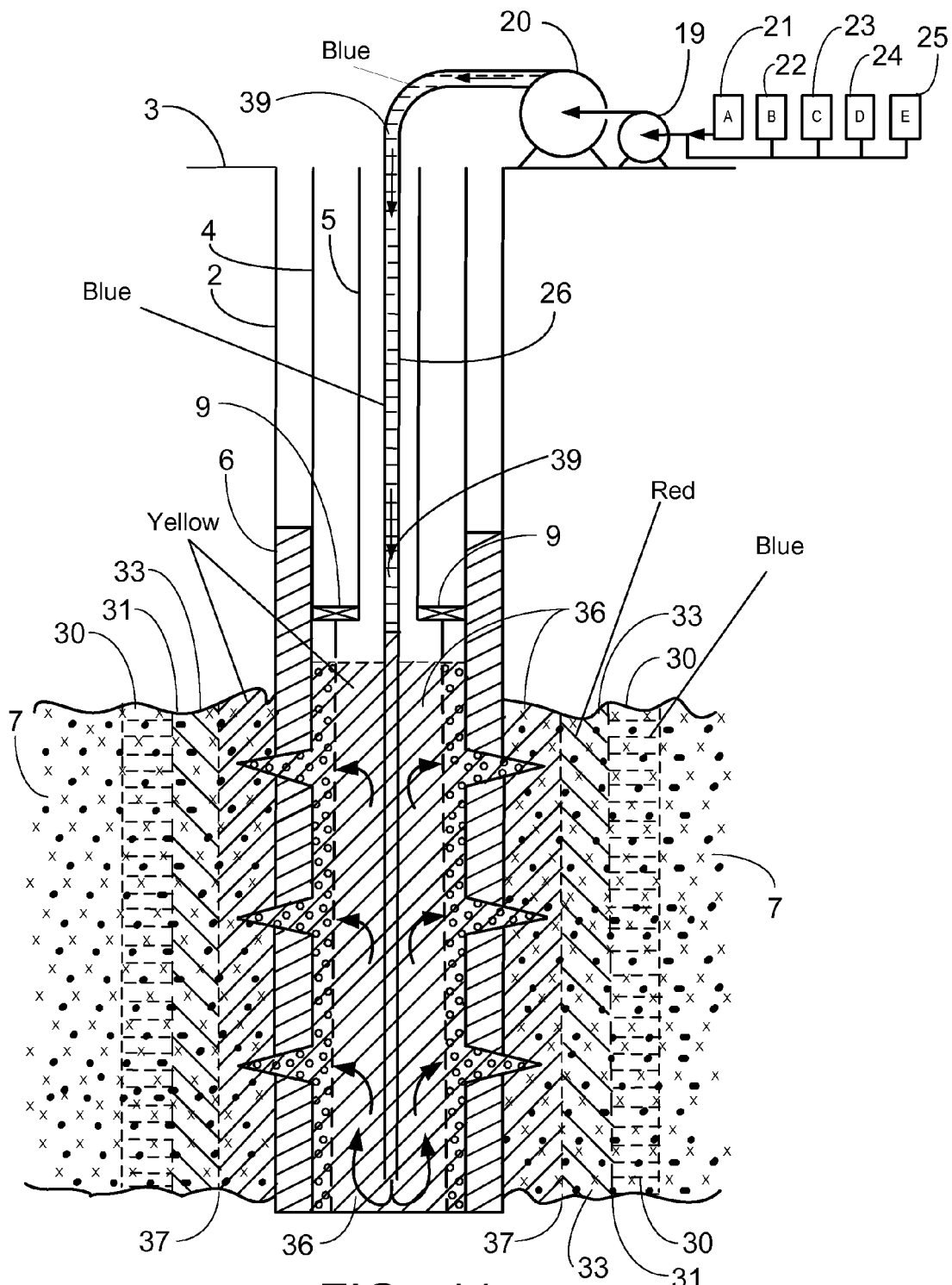
FIG. 11 is a sectional elevation view of the method of the present invention showing placement of an acid preflush on the producing formation.
Figure 12:
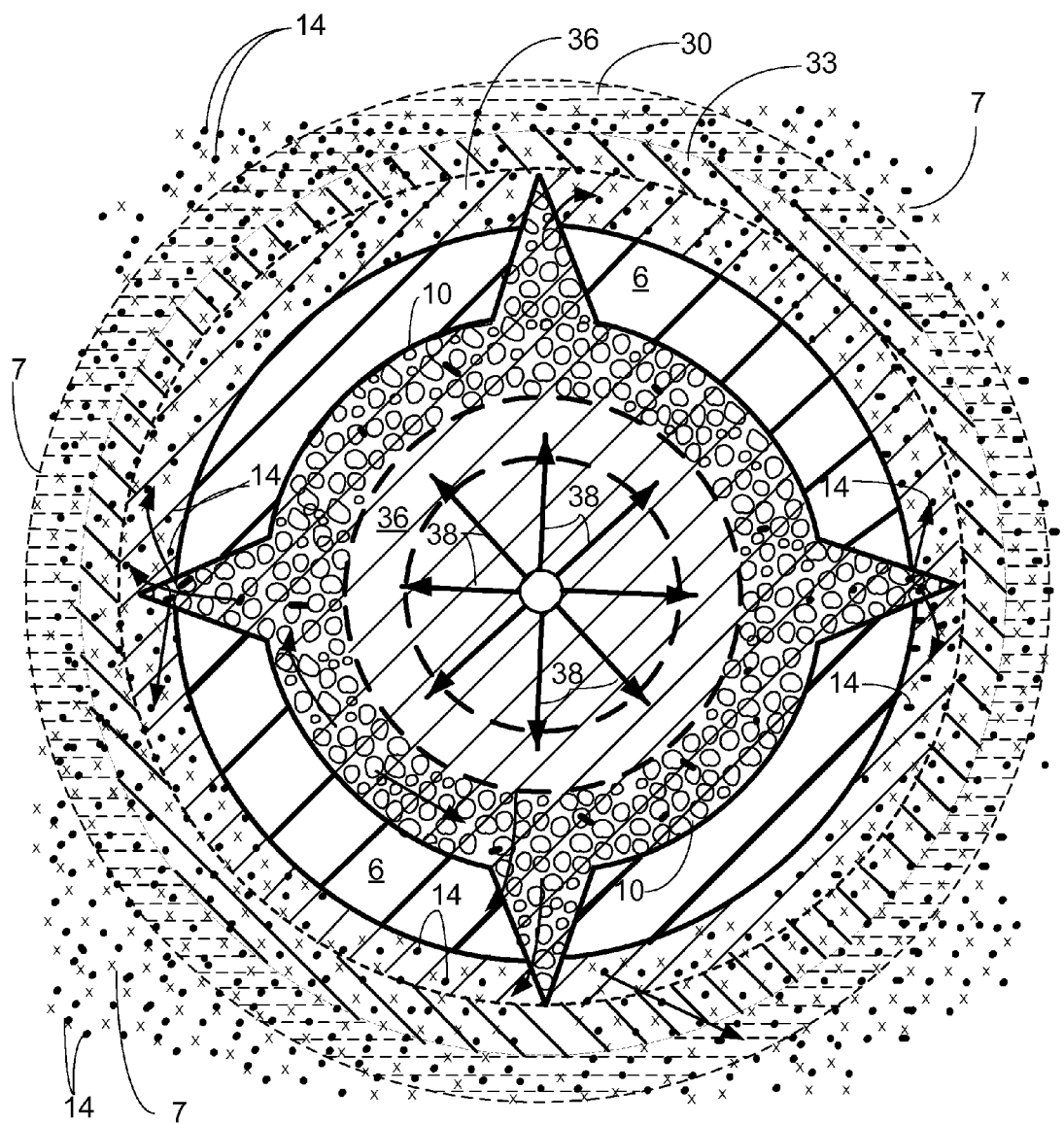
FIG. 12 is a transverse sectional view of the method of the present invention showing placement of an acid preflush on the producing formation.

In FIGS. 10-12, the relative positions of the solvent/preflush 30, water based preflush 33 and acid preflush 36 are shown. The numeral 37 illustrates the acid/water based preflush interface in FIG. 11.

After the placement of the acid preflush 36, a hydrochloric acid, a hydrofluoric acid blend 39 from tank 24 can be added to the well. As with the other fluids, the hydrofluoric acid blend 39 can be transmitted into the well using coil tubing unit 20 and its coil tubing 26. Arrows 38 in FIG. 12 illustrate the radial movement of the hydrofluoric acid 39 through the gravel pack 10 and into the surrounding formation 7.

Figure 13:
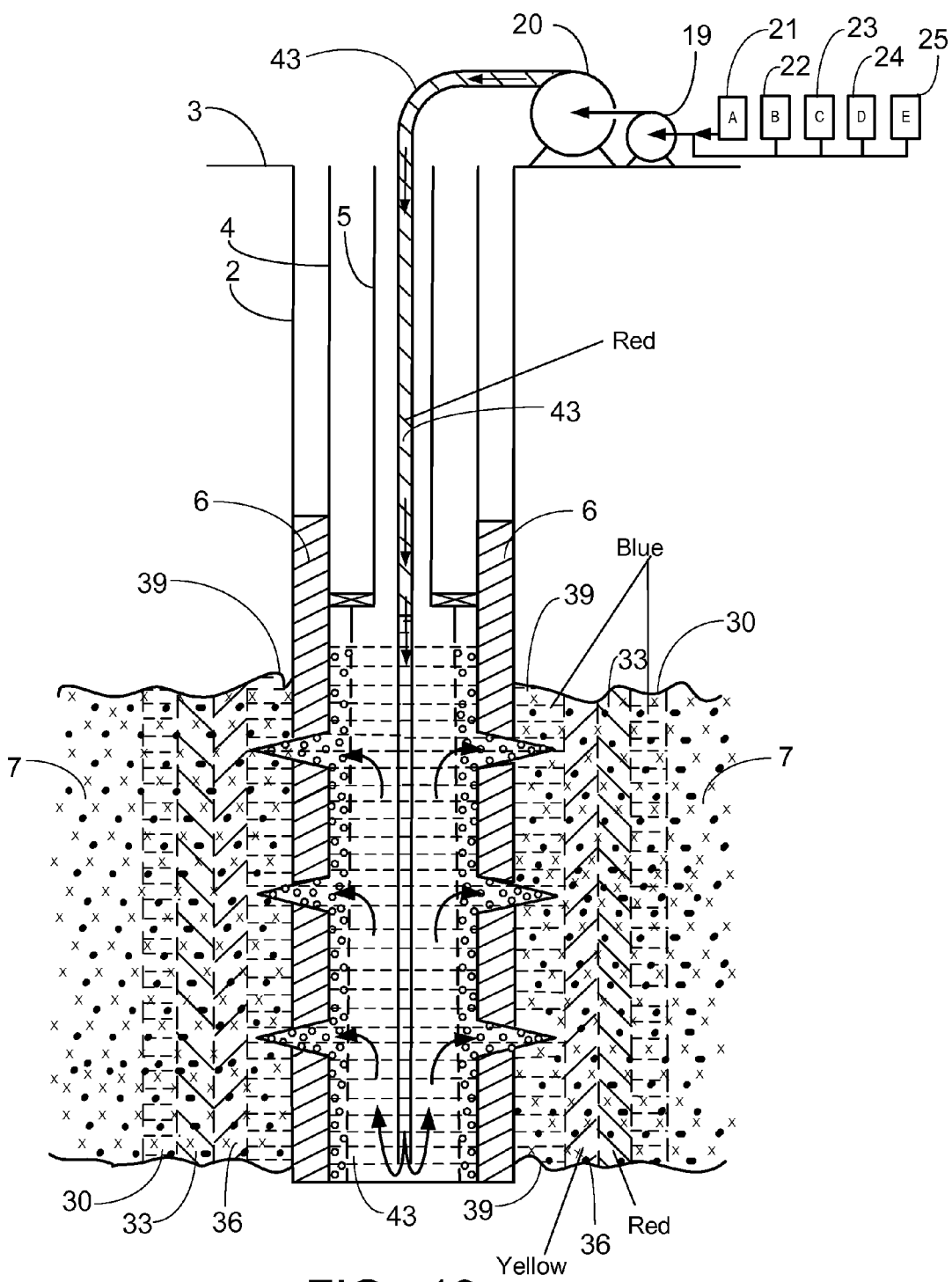
FIG. 13 is a sectional elevation view of the method of the present invention showing placement of hydrofluoric acid or HCL:HF blend on the producing formation.
Figure 14:
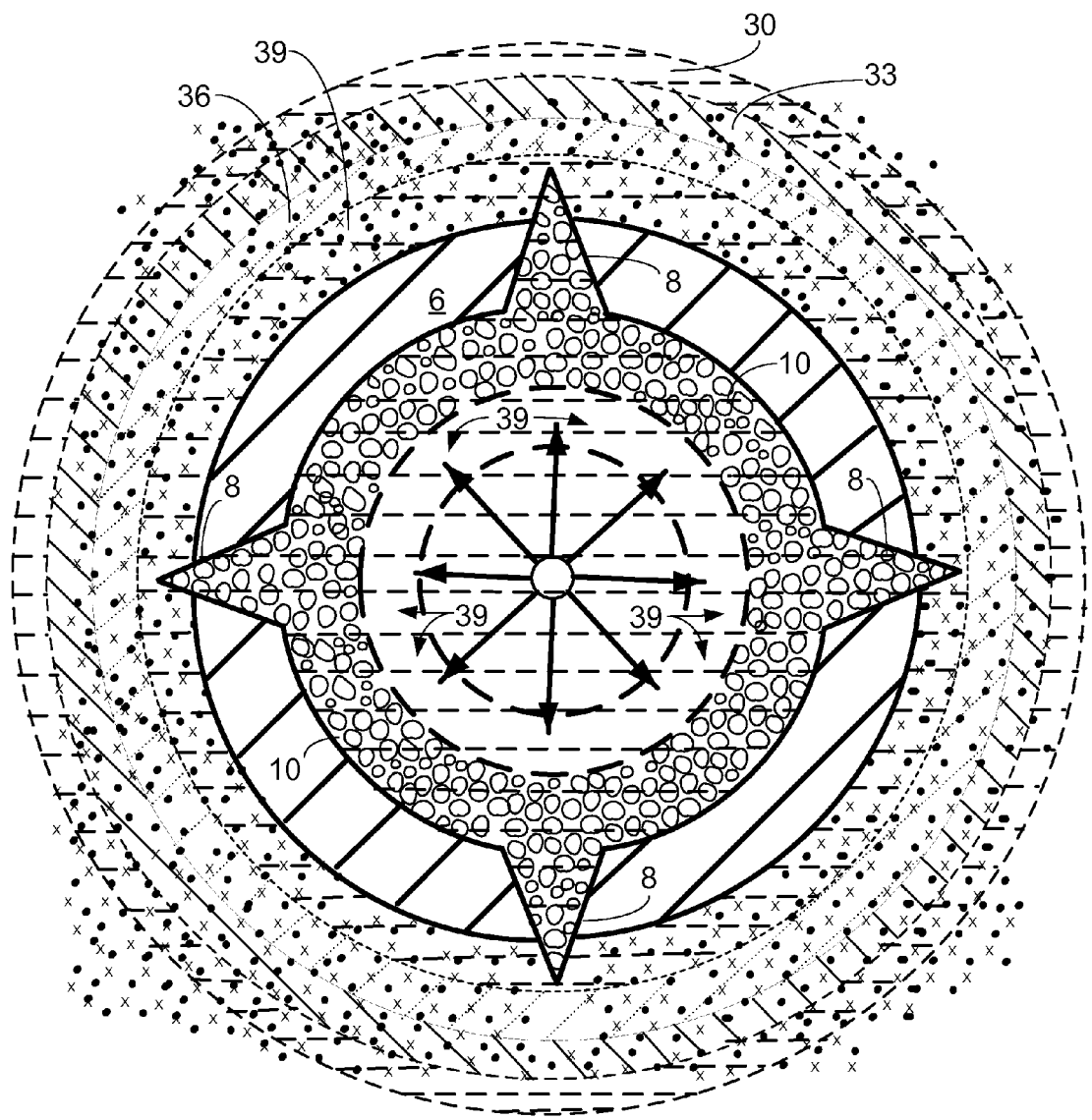
FIG. 14 is a transverse sectional view of the method of the present invention showing placement of an hydrofluoric acid or HCL:HF blend on the producing formation.

The hydrofluoric acid blend 39 removes hydrofluoric soluble damage. After the hydrofluoric acid blend 39 is added to the well, an overflush 43 consists of either water, HCL followed by water or an organic acid solution followed by water, can be placed into the formation as illustrated in FIGS. 13-14. Overflush 43 pushes the hydrofluoric acid blend (HF) through the gravel pack 10 and into the formation 7 to spend the acid and remove damage.

Figure 15:
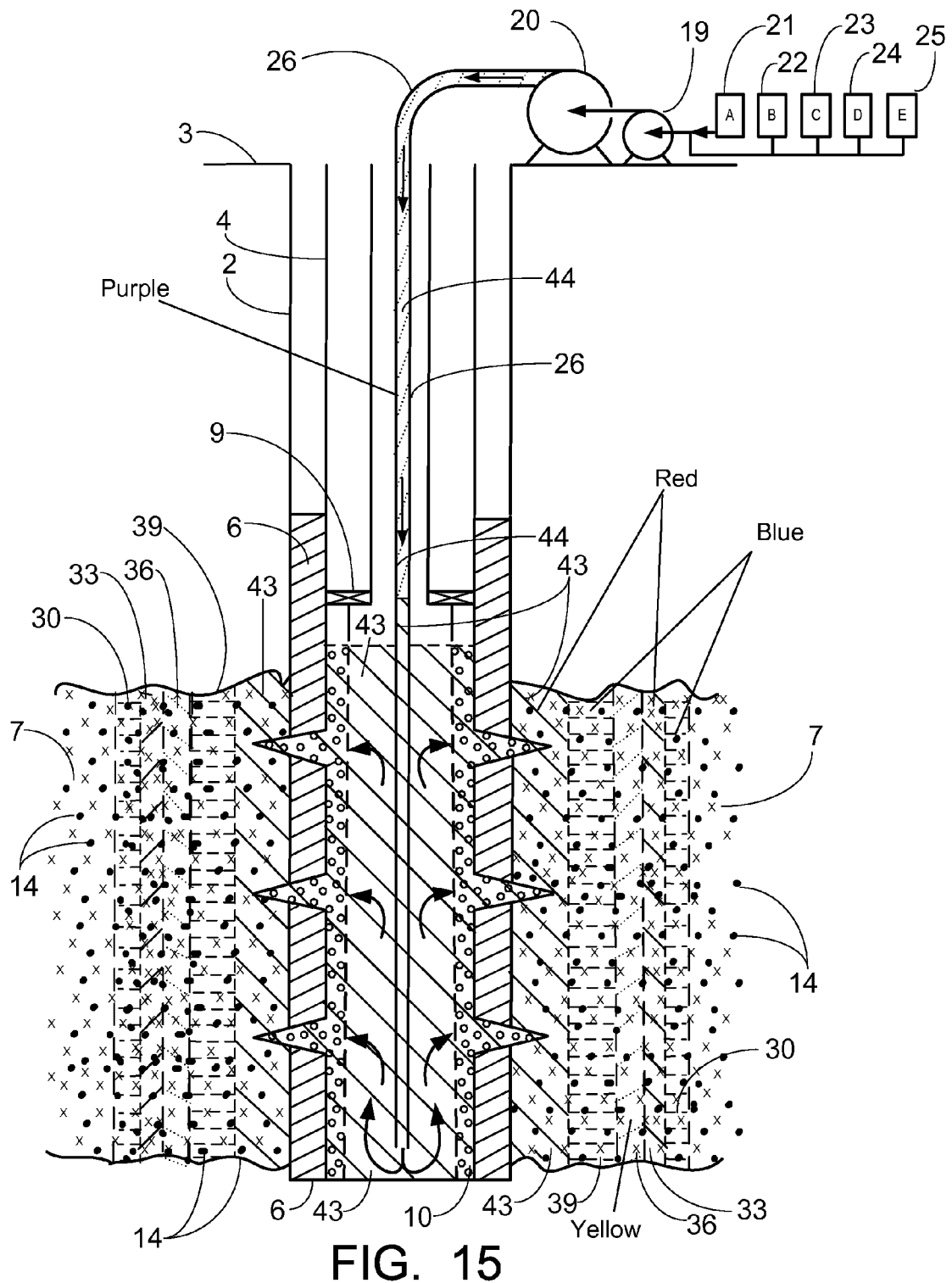
FIG. 15 is a sectional elevation view of the method of the present invention showing placement of a water overflush in the producing formation.
Figure 16:
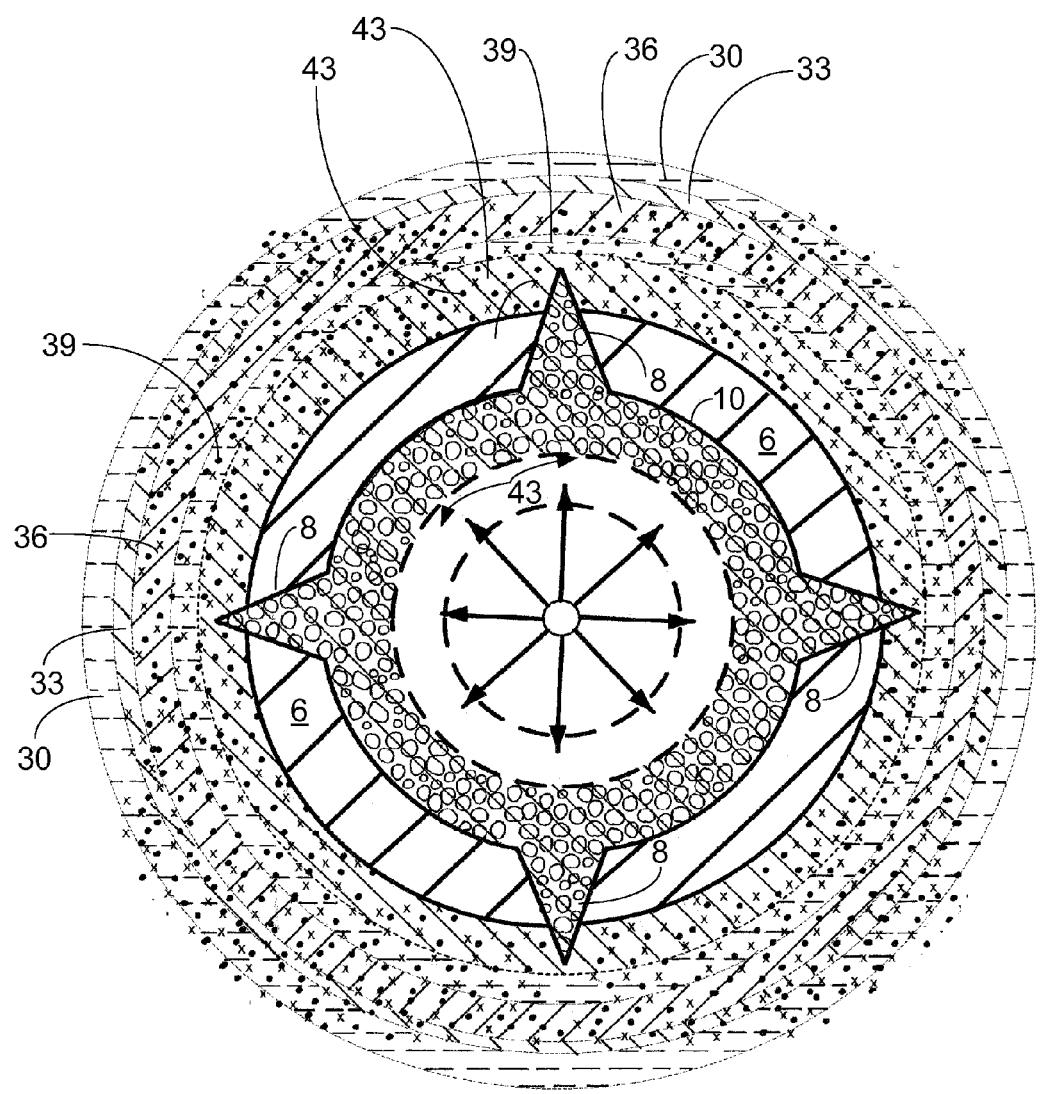
FIG. 16 is a transverse sectional view of the method of the present invention showing placement of a water overflush in the producing formation.

FIGS. 15-16 show the overflush in formation matrix flow. In this step, fine particulate matter or fines 14 are swept from the gravel pack 10 into the matrix/producing formation 7.

Figure 17:
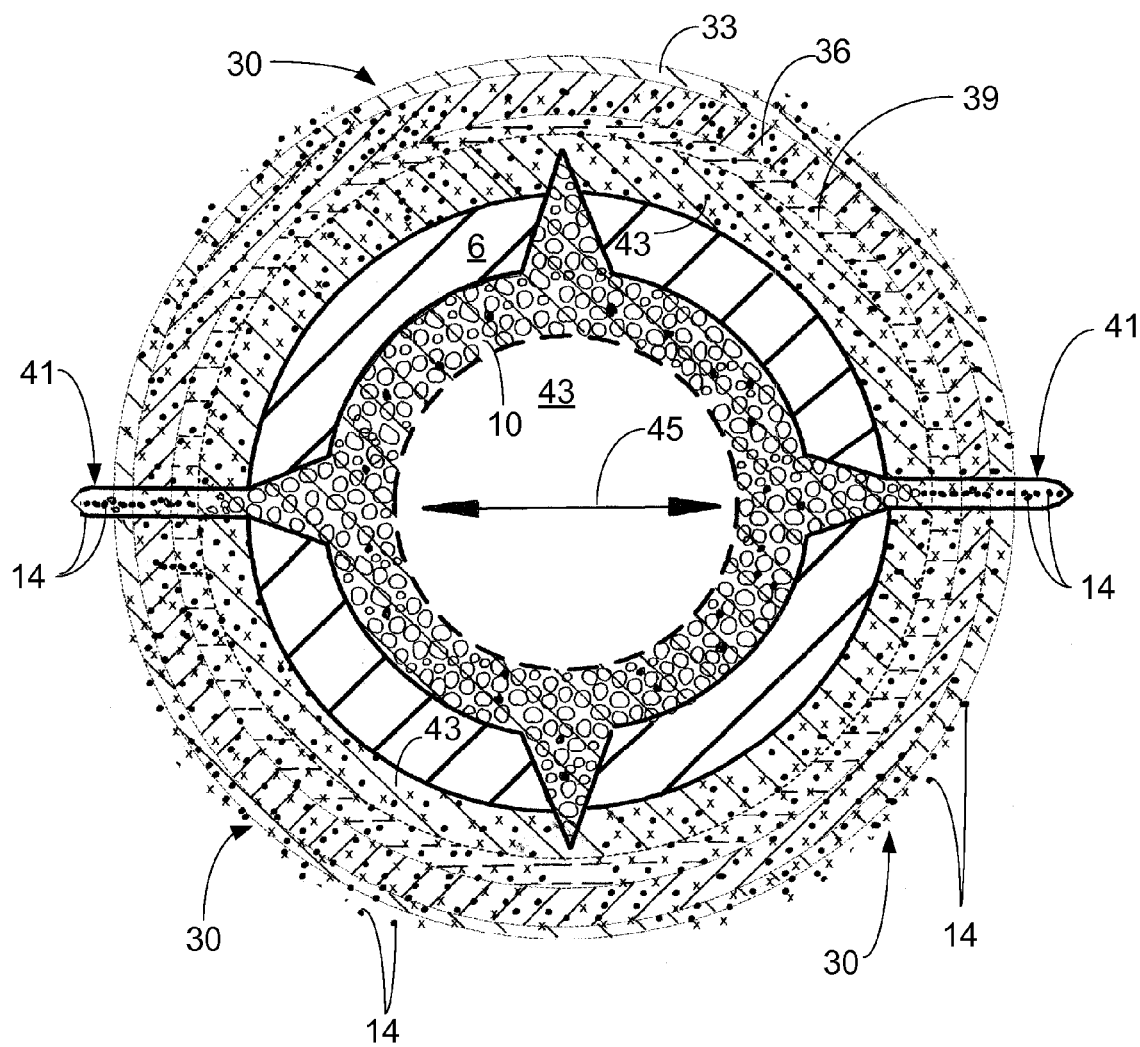
FIG. 17 is a transverse sectional view of the method of the present invention showing placement of a water overflush in the producing formation with cross fracture flow.

FIG. 17 illustrates that a hydraulic fracture 41 can be formed. Fine particulate matter 14 can be transported into the fracture with overflush fluid. In FIG. 17, the flow of fine particulate matter 14 into fracture 41 is illustrated schematically by arrow 45.

Figure 18:
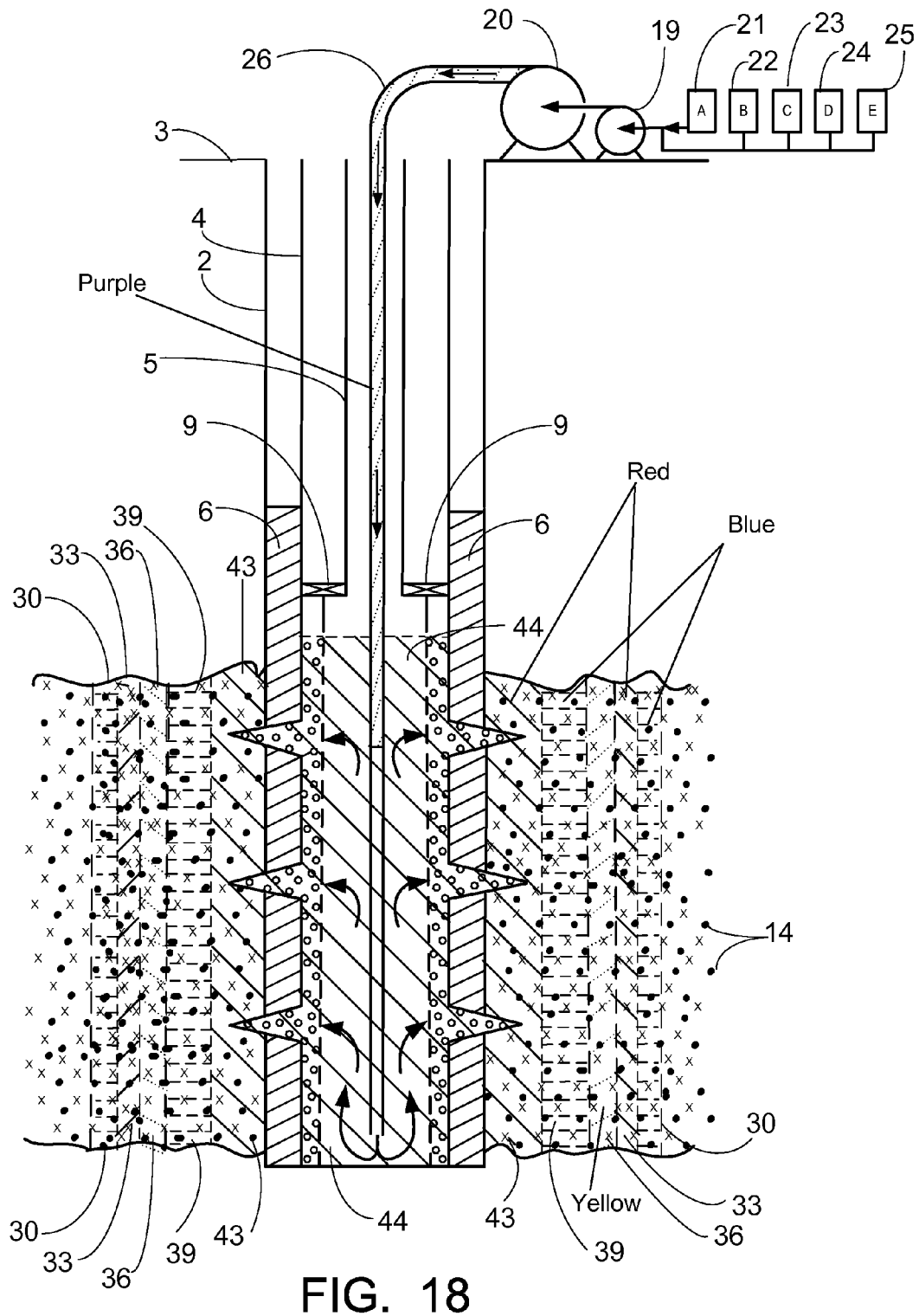
FIG. 18 is a sectional elevation view of the method of the present invention showing placement of a methanol/water mixture.

In FIG. 18, the method of the present invention has been completed. A methanol water mixture 44 is added to the well bore using the coil tubing unit 20 and its coil tubing 26. The methanol/water mixture (e.g. a 50:50 mix) is a displacement fluid that pushes the overflush 43 through the gravel pack 10.

Figure 19:
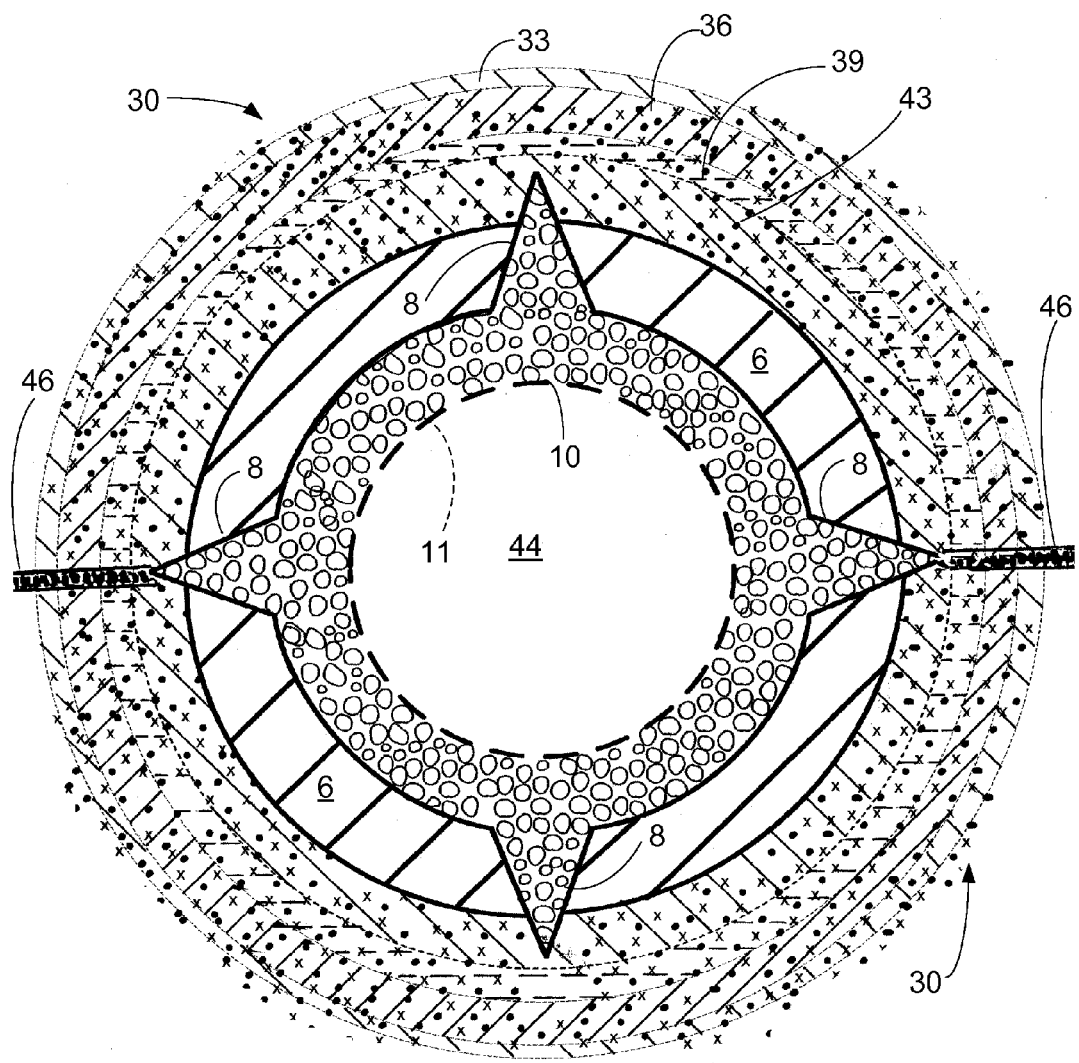
FIG. 19 is a transverse, sectional view of the method of the present invention that illustrates the path of travel of fines from the gravel pack to the fracture and the fracture sealed.

FIG. 18 is a sectional view that illustrates a sweeping of the fine particulate matter from the gravel pack into the surrounding formation and fracture. In FIG. 19, the fracture has closed, trapping fine particulate matter 14. The closed fracture is indicated as numeral 46.

Figure 20:
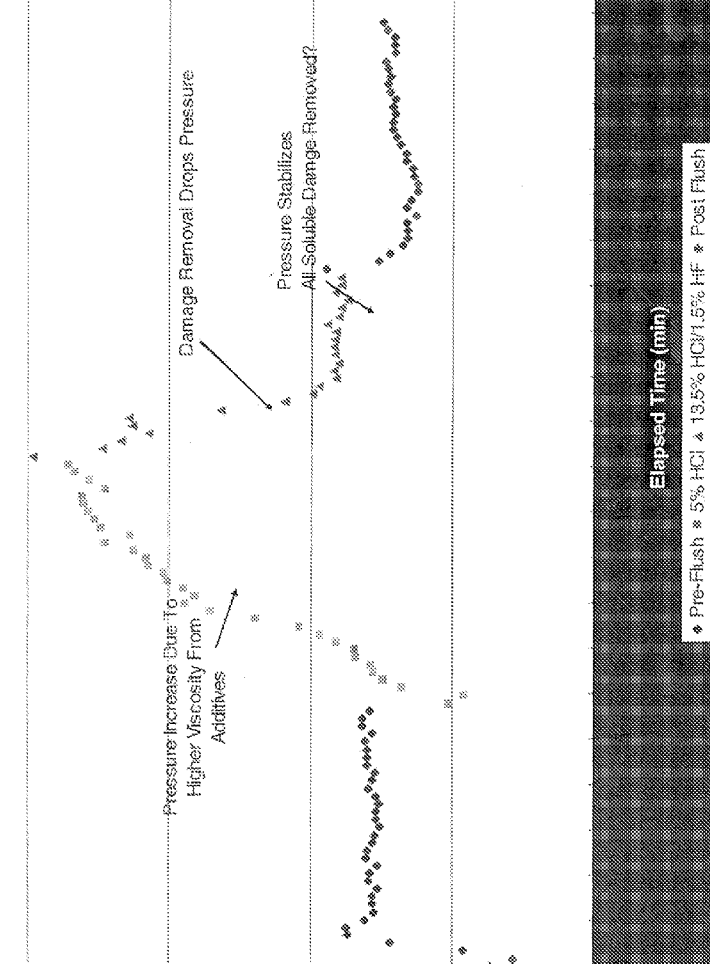

FIGS. 20-21 are laboratory test results that illustrate increased flow rate after simulated treatment of a test well using the method and apparatus of the present invention.

The following is a list of part numbers and corresponding descriptions as used herein.

PARTS LIST

| Part Number | Description |
| --- | --- |
| 1 | oil and gas well |
| 2 | borehole |
| 3 | earth's surface |
| 4 | casing |
| 5 | production tubing |
| 6 | cemented annulus |
| 7 | producing formation |
| 8 | perforation tunnel |
| 9 | production packer |
| 10 | gravel pack |
| 11 | screen |
| 12 | well bore |
| 13 | gravel |
| 14 | fine particulate matter (fines) |
| 15 | arrow indicating flow path |
| 16 | flow impediment from bridged fine |
| 17 | settled heavy particulate matter |
| 18 | erosion site |
| 19 | pump |
| 20 | coil tubing unit |
| 21 | tank |
| 22 | tank |
| 23 | tank |
| 24 | tank |
| 25 | tank |
| 26 | coil tubing |
| 27 | lower end |
| 28 | arrow |
| 29 | arrow |
| 30 | solvent preflush |
| 31 | solvent preflush interface |
| 32 | arrow indicating fluid injection path |
| 33 | water based flush/overflush |
| 34 | plug |
| 35 | arrow |
| 36 | acid preflush |
| 37 | acid preflush interface |
| 38 | arrow |
| 39 | hydrofluoric acid |
| 40 | HF acid interface |
| 41 | fracture |
| 42 | arrow |
| 43 | water overflush |
| 44 | methanol/water mixture |
| 45 | arrow indicating flow into fracture |
| 46 | closed fracture |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of removing fine particulate matter from a well gravel pack, placed in the well in between a tubular casing with perforations adjacent to a producing formation and a tubular screen, comprising the steps of:

a) placing a tube in the well bore, the tube extending from a position near the earth's surface to a position just above or next to the gravel pack;

b) pumping a solvent pre-flush into the well bore via the tube in sufficient volume to pre-flush the gravel pack, perforations, and a part of the producing formation that is next to the perforations;

c) pumping a water based pre-flush into the well bore via the tube in sufficient volume to pre-flush the gravel pack, perforations, and a part of the producing formation that is next to the perforations;

d) pumping an acid pre-flush into the well bore via the tube in sufficient volume to pre-flush the gravel pack, perforations, and a part of the producing formation that is next to the perforations;

e) pumping an HF acid mixture into the well bore via the tube in sufficient volume to penetrate the gravel pack, perforations, and a part of the producing formation that is next to the perforations;

f) pumping an overflush of fresh water treated with ammonium chloride or other clay protecting chemical, a water-wetting surfactant, and a non-emulsifying surfactant into the well bore via the tube in sufficient volume to flush HF acid mixture to a range of 3' to 6' into the formation matrix;

g) pumping a solvent wash into the well bore via the tube in sufficient volume to fill the porosity of the gravel pack;

h) wherein in steps "b" through "g", injection rates for all fluids pumped into the gravel pack and the formation are a rate sufficiently slow to prevent initiation of a hydraulic fracture; and i) wherein steps "b" through "g" some of the fine particulate matter is dissolved and some of the fine particulate matter is physically dislodged from the gravel pack and carried into the formation.

2. The method in claim 1, wherein the tube in step "a" is the production tubing.

3. The method in claim 1, wherein the tube in step "a" is part of a coiled tubing unit wherein the lower end of the coiled tubing is positioned near the bottom of the gravel pack.

4. The method in claim 1, wherein the tube in step "a" is part of a coiled tubing unit wherein the lower end of the coiled tubing is positioned near the top of the gravel pack.

5. The method in claim 1, wherein the tube in step "a" is part of a coiled tubing unit wherein the lower end of the coiled tubing is moved continuously throughout the pumping operation in steps "b" through "g" between a position near the top of the gravel pack and a position near the bottom of the gravel pack.

6. The method in claim 1, wherein in step "b", the solvent pre-flush consists of an organic liquid including xylene or toluene or other organic solvent capable of dissolving paraffins with non-emulsifying surfactants added to the pre-flush.

7. The method in claim 6, wherein the volume of the solvent pre-flush is a range of 5 to 20 gallons per foot of gravel pack screen.

8. The method of claim 1, wherein in step "c", the water-based pre-flush consists of fresh water treated with ammonium chloride or other clay protecting chemical, a water-wetting surfactant, and a non-emulsifying surfactant.

9. The method in claim 8, wherein the volume of the water based pre-flush is in a range of 20 to 50 gallons per foot of gravel pack screen.

10. The method in claim 1, wherein in step "d", the acid-based pre-flush consists of a blend of diluted acid, a corrosion inhibitor, a non-emulsifying surfactant, and a water-wetting surfactant.

11. The method in claim 10, wherein the diluted acid is hydrochloric acid in concentration of three percent (3%) to twenty percent (20%) by volume.

12. The method in claim 10, wherein the diluted acid is a combination of hydrochloric acid in concentration of three percent (3%) to twenty percent (20%) and acetic acid or formic acid in a concentration of three percent (3%) to twenty percent (20%) by volume.

13. The method in claim 10, wherein the diluted acid is acetic acid or formic acid in a concentration of three percent (3%) to twenty percent (20%) diluted with a solution of water with two percent (2%) to fifteen percent (15%) ammonium chloride by volume.

14. The method in claim 10, wherein the volume of acid pre-flush is up to 150 gallons per foot of gravel pack screen.

15. The method of claim 1, wherein in step "e", the HF acid mixture consists of hydrofluoric acid with concentration of half percent (0.5%) to three percent (3%) combined with hydrochloric acid with concentration of three percent (3%) to twenty percent (20%) by volume.

16. The method of claim 15, wherein the volume of the HF acid mixture is up to 150 gallons per foot of gravel pack screen.

17. The method in claim 1, wherein in step "f", the overflush fluid consists of a fluid train with the first fluid being a volume in the range from ¼ to ¾ of the total overflush volume of a blend of diluted acid, a corrosion inhibitor, a non-emulsifying surfactant, and a water-wetting surfactant and the second fluid consists of a volume in the range from ¾ to ¼ of the total overflush volume of fresh water treated with ammonium chloride or other clay protecting chemical, a water-wetting surfactant, and a non-emulsifying surfactant.

18. The method in claim 17, wherein the diluted acid is hydrochloric acid in concentration of three percent (3%) to twenty percent (20%) by volume.

19. The method in claim 17, wherein the diluted acid a combination of hydrochloric acid in concentration of three percent (3%) to twenty percent (20%) and acetic acid or formic acid in a concentration of three percent (3%) to twenty percent (20%) by volume.

20. The method in claim 17, wherein the diluted acid is acetic acid or formic acid in a concentration of three percent (3%) to twenty percent (20%) diluted with a solution of water with two percent (2%) to fifteen percent (15%) ammonium chloride by volume.

21. The method in claim 1, wherein in step "f", the volume of overflush is up to 150 gallons per foot of gravel pack screen.

22. The method in claim 1, wherein in step "g", the solvent wash consists of an alcohol and water mixture.

23. The method in claim 22, wherein the solvent wash consists of a 50:50 blend of methanol and water by volume and solvent wash volume is up to 20 gallons per foot of gravel pack screen.

24. The method of claim 1, wherein the flow of hydrocarbon from the well is improved from between about 20% to 100% from initial damaged flow rate to flow rate following treatment.

25. A method of removing fine particulate matter from a well gravel pack, placed in the well in between a tubular casing with perforations adjacent to a producing formation and a tubular screen, comprising the steps of:

a) placing a tube in the well bore, the tube extending from a position near the earth's surface to a position just above or next to the gravel pack;

b) pumping a solvent pre-flush into the well bore via the tube in sufficient volume to pre-flush the gravel pack, perforations, and a part of the producing formation that is next to the perforations;

c) pumping a water based pre-flush into the well bore via the tube in sufficient volume to pre-flush the gravel pack, perforations, and a part of the producing formation that is next to the perforations;

d) pumping an acid-preflush into the well bore via the tube in sufficient volume to pre-flush the gravel pack, perforations, and a part of the producing formation that is next to the perforations;

e) pumping an HF acid mixture into the well bore via the tube in sufficient volume to penetrate the gravel pack, perforations, and a part of the producing formation that is next to the perforations;

f) pumping an overflush comprising fresh water treated with ammonium chloride or other clay protecting chemical, a water-wetting surfactant, and a non-emulsifying surfactant into the well bore via the tube in sufficient volume to flush HF acid mixture to a range of 3' to 6' into the formation matrix;

g) pumping a solvent wash into the well bore via the tube in sufficient volume to fill the porosity of the gravel pack;

h) wherein steps "b" through "e" and in step "g", injection rates for all fluids pumped into the gravel pack and the formation are a rate sufficiently slow to prevent initiation of a hydraulic fracture;

i) wherein step "f", injection rate for the last half of the overflush volume is raised to a rate that generates sufficient pressure on the formation to create a hydraulic fracture of sufficiently narrow width to prevent entry of the gravel pack proppant; and j) wherein steps "b" through "g" some of the fine particulate matter is dissolved and some of the fine particulate matter is physically dislodged from the gravel pack and carried into the formation.

26. The method in claim 25, wherein the tube in step "a" is the production tubing.

27. The method in claim 25, wherein the tube in step "a" is part of a coiled tubing unit wherein the lower end of the coiled tubing is positioned near the bottom of the gravel pack.

28. The method in claim 25, wherein the tube in step "a" is part of a coiled tubing unit wherein the lower end of the coiled tubing is positioned near the top of the gravel pack.

29. The method in claim 25, wherein the tube in step "a" is part of a coiled tubing unit wherein the lower end of the coiled tubing is moved continuously throughout the pumping operation in steps "b" through "g" between a position near the top of the gravel pack and a position near the bottom of the gravel pack.

30. The method in claim 25, wherein in step "b," the solvent pre-flush consists of an organic liquid capable of dissolving paraffins with non-emulsifying surfactants added to the pre-flush.

31. The method in claim 30, wherein the volume of the solvent pre-flush is in a range of 5 to 20 gallons per foot of gravel pack screen.

32. The method of claim 25, wherein in step "c", the water-based pre-flush consists of fresh water treated with ammonium chloride or other clay protecting chemical, a water-wetting surfactant, and a non-emulsifying surfactant.

33. The method in claim 32, wherein the volume of the water based pre-flush is 1 to 100 gallons per foot.

34. The method in claim 25, wherein in step "d", the acid-based pre-flush consists of a blend of diluted acid, a corrosion inhibitor, a non-emulsifying surfactant, and a water-wetting surfactant.

35. The method in claim 34, wherein the diluted acid is hydrochloric acid in concentration of three percent (3%) to twenty percent (20%) by volume.

36. The method in claim 34, wherein the diluted acid is a combination of hydrochloric acid in concentration of three percent (3%) to twenty percent (20%) and acetic acid or formic acid in a concentration of three percent (3%) to twenty percent (20%) by volume.

37. The method in claim 34, wherein the diluted acid is acetic acid or formic acid in a concentration of three percent (3%) to twenty percent (20%) diluted with a solution of water with two percent (2%) to fifteen percent (15%) ammonium chloride by volume.

38. The method in claim 34, wherein the volume of acid pre-flush is up to 150 gallons per foot of gravel pack screen.

39. The method of claim 25, wherein in step "e", the HF acid mixture consists of hydrofluoric acid with concentration of half percent (0.5%) to three percent (3%) combined with hydrochloric acid with concentration of three percent (3%) to twenty percent (20%) by volume.

40. The method of claim 39 wherein the volume of the HF acid mixture is up to 150 gallons per foot of gravel pack screen.

41. The method in claim 25 wherein in step "f", the overflush fluid consists of fresh water treated with ammonium chloride or other clay protecting chemical, a water-wetting surfactant, and a non-emulsifying surfactant.

42. The method in claim 25, wherein in step "f," the overflush fluid consists of a fluid train with the first fluid being a volume in the range from ¼ to ¾ of the total overflush volume of a blend of diluted acid, a corrosion inhibitor, a non-emulsifying surfactant, and a water-wetting surfactant the second fluid consists of a volume in the range of ¾ to ¼ of the total overflush volume of fresh water treated with ammonium chloride or other clay protecting chemical, a water-wetting surfactant, and a non-emulsifying surfactant.

43. The method in claim 42, wherein the diluted acid is hydrochloric acid in concentration of three percent (3%) to twenty percent (20%) by volume.

44. The method in claim 42, wherein the diluted acid a combination of hydrochloric acid in concentration of three percent (3%) to twenty percent (20%) and acetic acid or formic acid in a concentration of three percent (3%) to twenty percent (20%) by volume.

45. The method in claim 42, wherein the diluted acid is acetic acid or formic acid in a concentration of three percent (3%) to twenty percent (20%) diluted with a solution of water with two percent (2%) to fifteen percent (15%) ammonium chloride by volume.

46. The method in claim 25, wherein in step "f", the volume of overflush is up to 150 gallons per foot of gravel pack screen.

47. The method in claim 25, wherein in step "g", the solvent wash consists of an alcohol and water mixture.

48. The method in claim 47 wherein the solvent wash consists of a 50:50 blend of methanol and water by volume and solvent wash volume is up to 20 gallons per foot of gravel pack screen.

49. The method of claim 25 wherein the flow of hydrocarbon from the well is improved from between about 20% to 100% from initial damaged flow rate to flow rate following treatment.

50. A method of removing fine particulate matter from a well gravel pack, placed in the well in between a tubular casing with perforations adjacent a producing formation and a tubular screen, comprising the steps of:
 a) placing a tube in the well bore, the tube extending from a position near the earth's surface to a position just above or next to the gravel pack;
 b) pumping a solvent preflush into the well bore via the tube in sufficient volume to preflush the gravel pack, perforations and a part of a producing formation that is next to the perforations;
 c) pumping a water based preflush into the well bore via the tube in sufficient volume to preflush the gravel pack, perforations and a part of a producing formation that is next to the perforations;
 d) pumping an acid preflush into the well bore via the tube in sufficient volume to preflush the gravel pack, perforations and a part of a producing formation that is next to the perforations; and
 e) wherein in steps "b" through "d" some of the fine particulate matter is dissolved.

51. The method of claim 50 wherein the lower end of the tubing is positioned near the top of the gravel pack.

52. The method of claim 50 wherein the lower end of the tubing is positioned near the bottom of the gravel pack.

53. The method of claim 50 wherein the tube in step "a" is part of a coil tubing unit.

54. The method of claim 50 wherein step "a" includes placing the tube with a coil tubing unit.

55. The method of claim 50 wherein at least some of the fine particulate matter are swept away from the gravel pack in steps "b" through "d".

56. The method of claim 50 further comprising pumping HF acid into the gravel pack.

57. The method of claim 50 further comprising pumping an alcohol and water mixture into the gravel pack.

58. The method of claim 50 further comprising pumping a methanol and water mixture into the gravel pack.

59. The method of claim 50 wherein the fine particulate matter is swept into the producing formation.

60. The method of claim 50 further comprising forming a fracture in the formation.

61. The method of claim 60 further comprising sweeping the fine particulate matter into the fracture.

62. The method of claim 50 wherein the acid is hydrochloric acid.

63. The method of claim 62 wherein the acid is 5% hydrochloric acid.

64. The method of claim 50 wherein the acid is a mixture of hydrochloric and hydrofluoric acid.

* * * * *